US006993584B2

(12) United States Patent
Border et al.

(10) Patent No.: US 6,993,584 B2
(45) Date of Patent: Jan. 31, 2006

(54) METHOD AND SYSTEM FOR IMPROVING NETWORK PERFORMANCE BY UTILIZING PATH SELECTION, PATH ACTIVATION, AND PROFILES

(75) Inventors: John Border, Poolesville, MD (US); Matthew Butehorn, Mt. Airy, MD (US)

(73) Assignee: Hughes Network Systems, El Segundo, CA (US)

( * ) Notice: Subject to any disclaimer, the term of this patent is extended or adjusted under 35 U.S.C. 154(b) by 925 days.

(21) Appl. No.: 09/903,779

(22) Filed: Jul. 12, 2001

(65) Prior Publication Data

US 2002/0010792 A1    Jan. 24, 2002

Related U.S. Application Data

(60) Provisional application No. 60/225,630, filed on Aug. 15, 2000, provisional application No. 60/220,026, filed on Jul. 21, 2000.

(51) Int. Cl.
*G06F 15/16* (2006.01)

(52) U.S. Cl. ..................... 709/227; 713/201

(58) Field of Classification Search ............... 709/229, 709/227; 370/466, 468, 469, 395.32, 268; 455/426.1
See application file for complete search history.

(56) References Cited

U.S. PATENT DOCUMENTS

| 6,272,148 B1 * | 8/2001 | Takagi et al. ............... 370/469 |
| 6,418,324 B1 * | 7/2002 | Doviak et al. ............ 455/426.1 |
| 6,748,439 B1 * | 6/2004 | Monachello et al. ....... 709/229 |
| 6,842,463 B1 * | 1/2005 | Drwiega et al. ............ 370/468 |
| 2002/0018449 A1 * | 2/2002 | Ricciulli ..................... 370/268 |
| 2002/0071436 A1 * | 6/2002 | Border et al. .......... 370/395.32 |
| 2005/0002419 A1 * | 1/2005 | Doviak et al. ............. 370/466 |

FOREIGN PATENT DOCUMENTS

WO    WO 98/58474    12/1998

OTHER PUBLICATIONS

Ariel Orda, "Routing with End-to-End QoS Guarantees in Broadband Networks", IEEE vol. 7, No. 3, Jun. 1999.*
Srinivasan et al, "A Constant-Factor Approximation Algorithm for Packet Routing, and Balancing Local vs. Global Criteria", ACM 1996.*
R. Braden, D. Clark, S. Shenker, "Integrated services in the internet architecture an overview", Network Working Group Request for Comments: 1633, Category: Informational, Jun. 1994, XP-002960148, pp. 1-34.

(Continued)

*Primary Examiner*—Viet D. Vu
*Assistant Examiner*—Jungwon Chang
(74) *Attorney, Agent, or Firm*—Craig Plastrik

(57) ABSTRACT

A communication system having a proxy architecture is disclosed. The system includes a platform that provides performance enhancing functions. The platform includes a path selection/activation apparatus that routes information within a communication system. The path selection/activation apparatus receives path selection and path activation parameters from the platform and maintains the current parameters in one or more path selection/activation profiles. The path selection/activation apparatus routes packets of information throughout the communication system based on the path selection and/or path activation profile. The above arrangement has particular applicability to a bandwidth constrained communication system, such as a satellite network.

36 Claims, 19 Drawing Sheets

OTHER PUBLICATIONS

"Policy-Based Routing, Policy-Based Routing Data Forwarding", CISCO White Paper, Jul. 3, 2000, XP-002241435, pp. 1-15.

Barzilai T P et al: "Design And Implementation of an RSVP-Based Quality of Service Architecture for an Integrated Services Internet", IEEE Journal on Selected areas inCommunications, IEEE Inc. New York, US, vol. 16, No. 3, Apr. 1, 1998, XP000740059, pp. 397-413.

Xiaoqiang Chen et al., "Evolution of ATM Internetworking", Bell Labs Technical Journal, Wiley, CA, US, Mar. 21, 1997, XP000695 70, pp. 82-110.

* cited by examiner

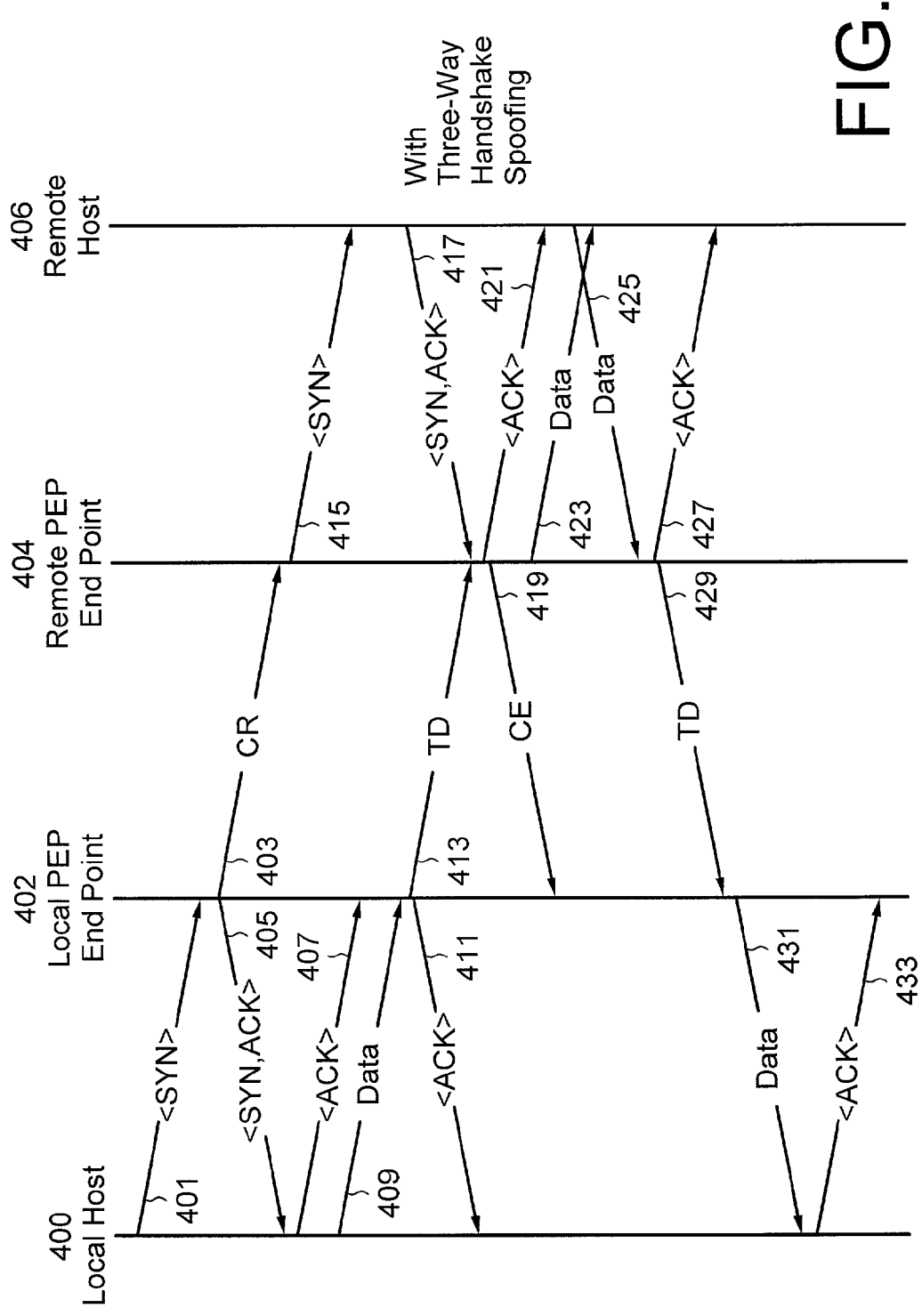

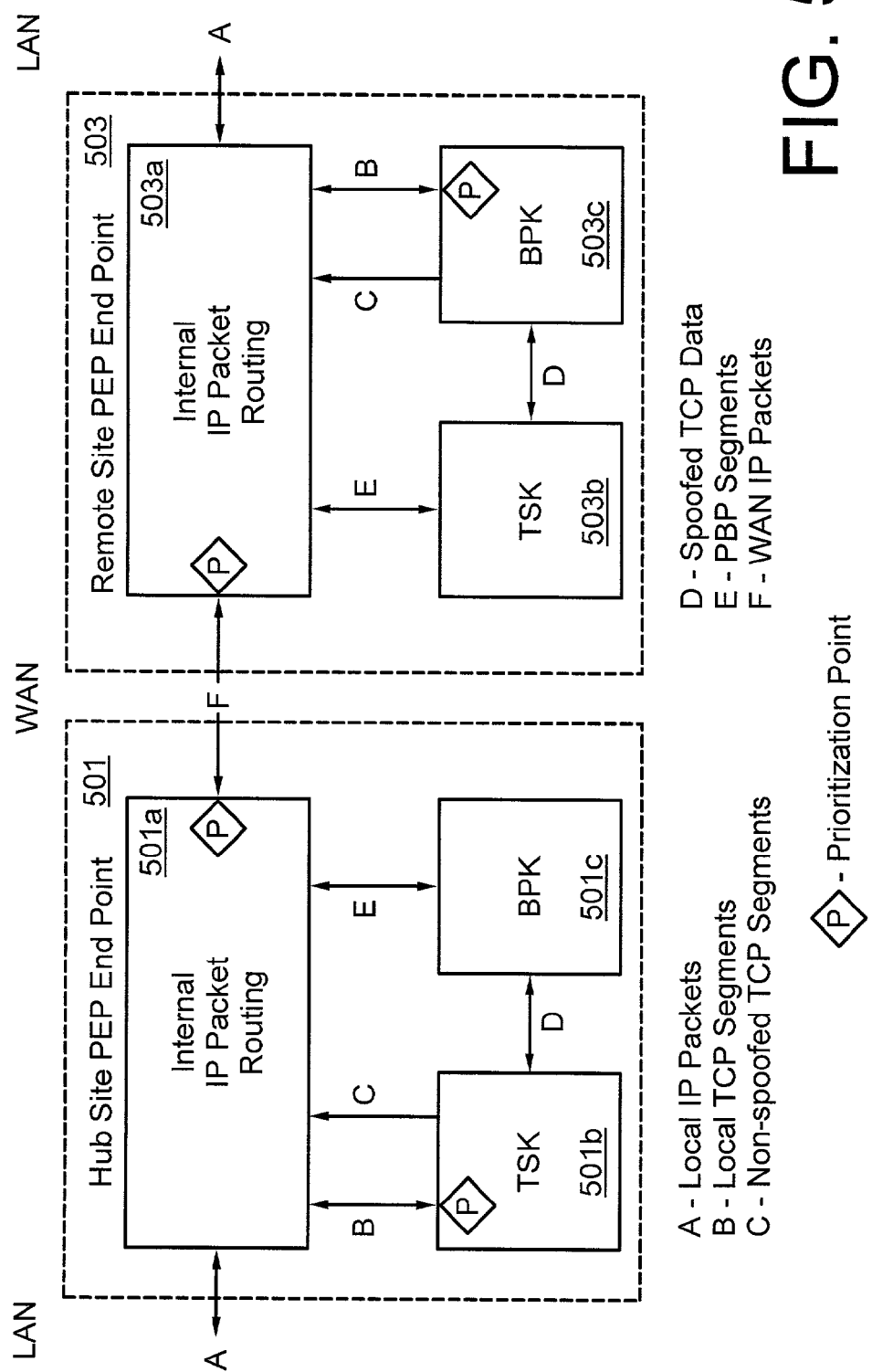

PRIOR ART

METHOD AND SYSTEM FOR IMPROVING NETWORK PERFORMANCE BY UTILIZING PATH SELECTION, PATH ACTIVATION, AND PROFILES

CROSS-REFERENCES TO RELATED APPLICATION

This application is related to and claims the benefit of priority to: (i) U.S. Provisional Patent Application (Ser. No. 60/220,026), filed Jul. 21, 2000, entitled "Performance Enhancing Proxy," and (ii) U.S. Provisional Patent Application (Ser. No. 60/225,630), filed Aug. 15, 2000, entitled "Performance Enhancing Proxy"; all of which are incorporated herein by reference in their entirety.

BACKGROUND OF THE INVENTION

1. Field of the Invention

The present invention is generally directed to a method and apparatus for improving the performance of networks, and more particularly, to a method and system utilizing path selection, path activation, and profiles, in order to improve network performance.

2. Discussion of the Background

The entrenchment of data networking into the routines of modern society, as evidenced by the prevalence of the Internet, particularly the World Wide Web, has placed ever-growing demands on service providers to continually improve network performance. To meet this challenge, service providers have invested heavily in upgrading their networks to increase system capacity (i.e., bandwidth). In many circumstances, such upgrades may not be feasible economically or the physical constraints of the communication system does not permit simply "upgrading." Accordingly, service providers have also invested in developing techniques to optimize the performance of their networks. Because much of today's networks are either operating with or are required to interface with the Transmission Control Protocol/Internet Protocol (TCP/IP) suite, attention has been focused on optimizing TCP/IP based networking operations.

As the networking standard for the global Internet, TCP/IP has earned such acceptance among the industry because of its flexibility and rich heritage in the research community.

The transmission control protocol (TCP) is the dominant protocol in use today on the Internet. TCP is carried by the Internet protocol (IP) and is used in a variety of applications including reliable file transfer and Internet web page access applications. The four layers of the TCP/IP protocol suite are illustrated in FIG. 18. As illustrated, the link layer (or the network interface layer) 1810 includes device drivers in the operating system and any corresponding network interface cards. Together, the device driver and the interface cards handle hardware details of physically interfacing with any cable or whatever type of media is being used. The network layer (also called the Internet layer) 1812 handles the movement of packets around the network. Routing of packets, for example, takes place at the network layer 1812. IP, Internet control message protocol (ICMP), and Internet group management protocol (IGMP) may provide the network layer in the TCP/IP protocol suite. The transport layer 1814 provides a flow of data between two hosts, for the application layer 1816 above.

In the TCP/IP protocol suite, there are at least two different transport protocols, TCP and a user datagram protocol (UDP). TCP, which provides a reliable flow of data between two hosts, is primarily concerned with dividing the data passed to it from the application layer 1816 into appropriately sized chunks for the network layer 1812 below, acknowledging received packets, setting timeouts to make certain the other end acknowledges packets that are sent, and so on. Because this reliable flow of data is provided by the transport layer 1814, the application layer 1816 can ignore these details. UDP, on the other hand, provides a much simpler service to the application layer 1816. UDP just sends packets of data called datagrams from one host to another, but there is no guarantee that the datagrams reach the other end. Any desired reliability must be added by the application layer 1816.

The application layer 1816 handles the details of the particular application. There are many common TCP/IP applications that almost every implementation provides. These include telnet for remote log-in, the file transfer protocol (FTP), the simple mail transfer protocol (SMTP) or electronic mail, the simple network management protocol (SNMP), the hypertext transfer protocol (HTTP), and many others.

TCP provides reliable, in-sequence delivery of data between two IP hosts. The IP hosts set up a TCP connection, using a conventional TCP three-way handshake and then transfer data using a window based protocol with the successfully received data acknowledged.

To understand where optimizations may be made, it is instructive to consider a typical TCP connection establishment. FIG. 19 illustrates an example of the conventional TCP three-way handshake between IP hosts 1920 and 1922. First, the IP host 1920 that wishes to initiate a transfer with IP host 1922, sends a synchronize (SYN) signal to IP host 1922. The IP host 1922 acknowledges the SYN signal from IP host 1920 by sending a SYN acknowledgement (ACK). The third step of the conventional TCP three-way handshake is the issuance of an ACK signal from the IP host 1920 to the IP host 1922. IP host 1922 is now ready to receive the data from IP host 1920 (and vice versa). After all the data has been delivered, another handshake (similar to the handshake described to initiate the connection) is used to close the TCP connection.

TCP was designed to be very flexible and works over a wide variety of communication links, including both slow and fast links, high latency links, and links with low and high error rates. However, while TCP (and other high layer protocols) works with many different kinds of links, TCP performance, in particular, the throughput possible across the TCP connection, is affected by the characteristics of the link in which it is used. There are many link layer design considerations that should be taken into account when designing a link layer service that is intended to support Internet protocols. However, not all characteristics can be compensated for by choices in the link layer design. TCP has been designed to be very flexible with respect to the links which it traverses. Such flexibility is achieved at the cost of sub-optimal operation in a number of environments vis-a-vis a tailored protocol. The tailored protocol, which is usually proprietary in nature, may be more optimal, but greatly lacks flexibility in terms of networking environments and interoperability.

An alternative to a tailored protocol is the use of performance enhancing proxies (PEPs), to perform a general class of functions termed "TCP spoofing," in order to improve TCP performance over impaired (i.e., high latency or high error rate) links. TCP spoofing involves an intermediate network device (the performance enhancing proxy (PEP)) intercepting and altering, through the addition and/or deletion of TCP segments, the behavior of the TCP connection in an attempt to improve its performance.

Conventional TCP spoofing implementations include the local acknowledgement of TCP data segments in order to get the TCP data sender to send additional data sooner than it would have sent if spoofing were not being performed, thus improving the throughput of the TCP connection. Generally, conventional TCP spoofing implementations have focused simply on increasing the throughput of TCP connections either by using larger windows over the link or by using compression to reduce the amount of data which needs to be sent, or both.

Many TCP PEP implementations are based on TCP ACK manipulation. These may include TCP ACK spacing where ACKs which are bunched together are spaced apart, local TCP ACKs, local TCP retransmissions, and TCP ACK filtering and reconstruction. Other PEP mechanisms include tunneling, compression, priority-based multiplexing, policy based routing, and the ability to support failover traffic.

In addition, network performance may be improved utilizing techniques such as path selection, either with or without profiles, and/or path activation, either with or without profiles.

Based on the foregoing, there is a clear need for improved techniques for routing information by activating and selecting the appropriate paths. Therefore, an approach for improving network performance utilizing techniques such as path selection and path activation is highly desirable.

Further, the ability to iteratively failover n (where n is an integer greater than or equal to 2) alternative paths would also improve network performance.

SUMMARY OF THE INVENTION

The present invention addresses the above stated need by providing a communication system with performance enhancing functionality. A path selection/activation apparatus communicates with the performance enhancing proxy (PEP) end point platforms to configure the platforms by utilizing profiles corresponding to the PEP end point platforms. According to one aspect of the invention, a method for routing information in a communication system that includes a platform and a path selection/activation apparatus configured to perform a plurality of performance enhancing functions is provided. The method includes receiving the information from the platform and receiving at least one of path selection parameters and path activation parameters, wherein the path selection/activation apparatus maintains a profile that contains the at least one of the path selection and path activation parameters and routing the information in accordance with the profile.

According to one aspect of the invention, a communication system includes a platform that is configured to provide performance enhancing functions is provided. The platform includes a communication system including a platform configured to provide performance enhancing functions, the platform supplying information and at least one of path selection and path activation parameters and a path selection/activation apparatus communicating with the platform, the path selection/activation apparatus being configured to receive the information and the at least one of path selection and path activation parameters from the platform, wherein the path selection/activation apparatus has a profile that specifies at least one of path selection and path activation parameters, wherein the communication system is configured to rout the information in accordance with the profile.

According to another aspect of the invention, a path selection/activation apparatus for monitoring a communication system that includes a platform configured to perform a plurality of performance enhancing functions is disclosed. The apparatus includes means for receiving the information and at least one of path selection and path activation parameters and means for maintaining a profile containing the at least one of path selection and path activation parameters; and means for routing the information in accordance with the profile.

In yet another aspect of the invention, a computer-readable medium carrying one or more sequences of one or more instructions for routing information in a communication system that includes a platform configured to perform a plurality of performance enhancing functions is disclosed. The computer-readable medium carries one or more sequences of one or more instructions which, when executed by one or more processors, cause the one or more processors to perform the steps of receiving the information from the platform and receiving at least one of path selection parameters and path activation parameters, wherein the path selection/activation apparatus maintains a profile that contains the at least one of the path selection and path activation parameters and routing the information in accordance with the profile.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4A and 4B are flow diagrams of the connection establishment with three-way handshake spoofing and without three-way handshake spoofing, respectively;

FIG. 5 is a diagram of a PEP packet flow between two PEP end points, according to an embodiment of the present invention;

DETAILED DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Although the present invention is discussed with respect to the Internet and the TCP/IP protocol suite, the present invention has applicability to other packet switched networks and equivalent protocols.

Figure 1:
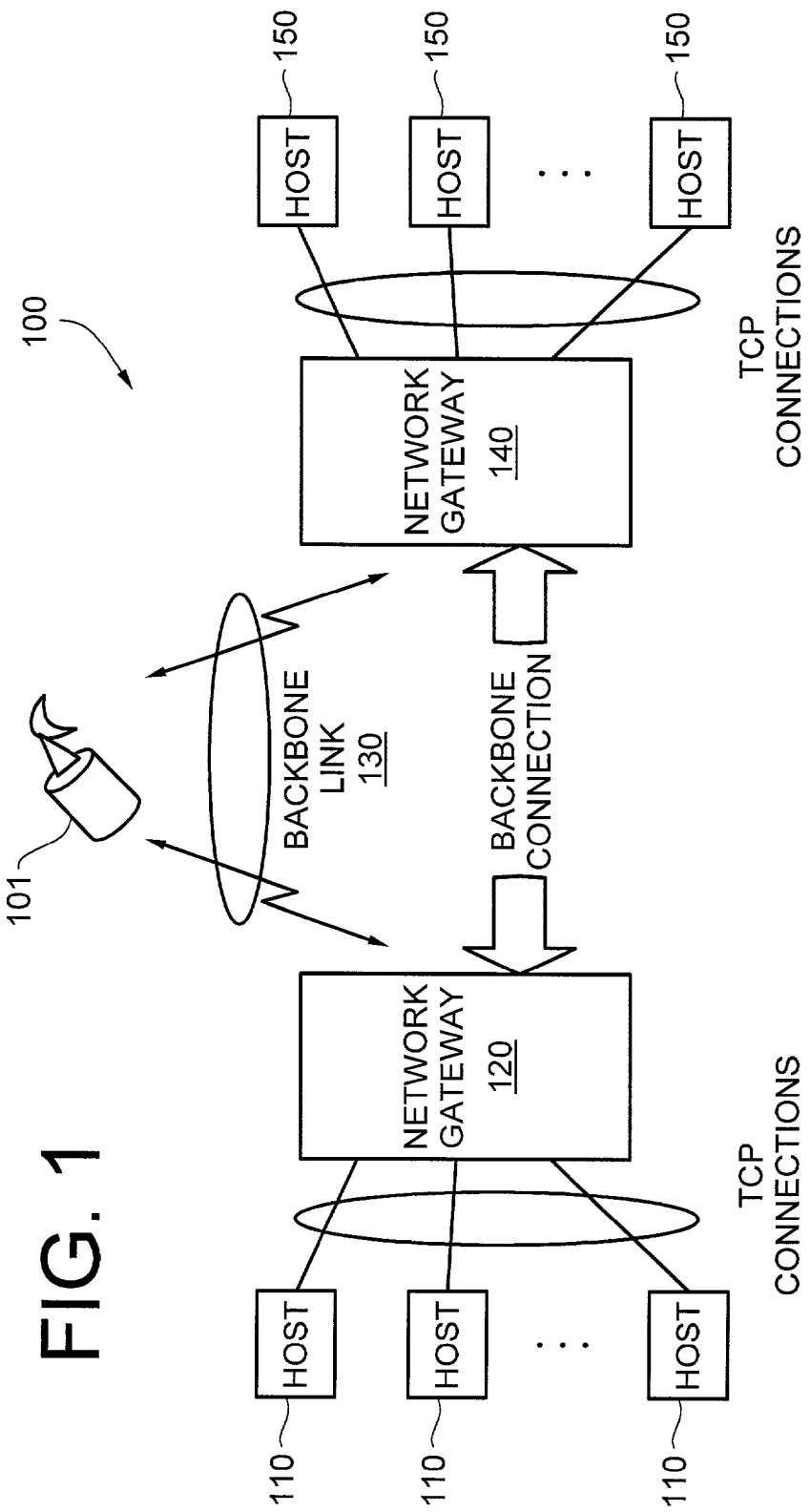
FIG. 1 is a diagram of a communication system in which the performance enhancing proxy (PEP) of the present invention is implemented.

FIG. 1 illustrates an exemplary network 100 in which the performance enhancing proxy (PEP) of the present invention may be utilized. The network 100 in FIG. 1 includes one or more hosts 110 connected to a network gateway 120 via TCP connections. The network gateway 120 is connected to another network gateway 140 via a backbone connection on a backbone link 130. As seen in FIG. 1, the backbone link 130, in an exemplary embodiment, is shown as a satellite link that is established over a satellite 101; however, it is recognized by one of ordinary skill in the art that other network connections may be implemented. For example, these network connections may be established over a wireless communications system, in general, (e.g., radio networks, cellular networks, etc.) or a terrestrial communications system. The network gateway 140 is further connected to a second group of hosts 150, also via TCP connections. In the arrangement illustrated in FIG. 1, the network gateways 120, 140 facilitate communication between the groups of hosts 110, 150.

The network gateways 120, 140 facilitate communication between the two groups of hosts 110, 150 by performing a number of performance enhancing functions. These network gateways 120, 140 may perform selective TCP spoofing, which allows flexible configuration of the particular TCP connections that are to be spoofed. Additionally, gateways 120, 140 employ a TCP three-way handshake, in which the TCP connections are terminated at each end of the backbone link 130. Local data acknowledgements are utilized by the network gateways 120, 140, thereby permitting the TCP windows to increase at local speeds.

The network gateways 120, 140 further multiplex multiple TCP connections across a single backbone connection; this capability reduces the amount of acknowledgement traffic associated with the data from multiple TCP connections, as a single backbone connection acknowledgement may be employed. The multiplexing function also provides support for high throughput TCP connections, wherein the backbone connection protocol is optimized for the particular backbone link that is used. The network gateways 120, 140 also support data compression over the backbone link 130 to reduce the amount of traffic to be sent, further leveraging the capabilities of the backbone connection. Further, the network gateways 120, 140 utilize data encryption in the data transmission across the backbone link 130 to protect data privacy, and provide prioritized access to backbone link 130 capacity on a per TCP connection basis. Each of the network gateways 120, 140 may select a particular path for the data associated with a connection to flow. The above capabilities of the network gateways 120, 140 are more fully described below.

Figure 2:
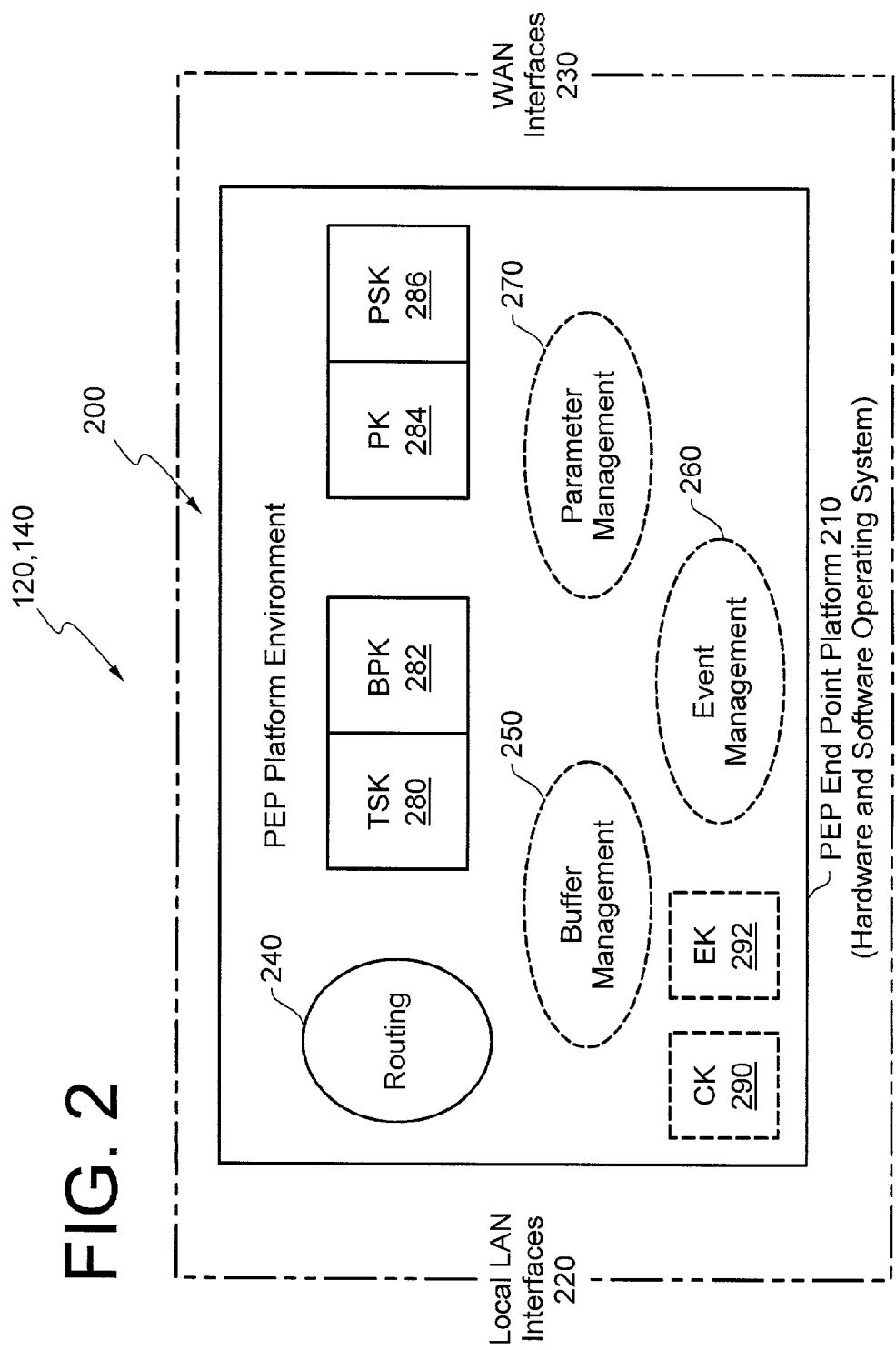
FIG. 2 is a diagram of a PEP end point platform environment, according to an embodiment of the present invention.

FIG. 2 illustrates a performance enhancing proxy (PEP) 200 as implemented in a network gateway 120, 140, according to one embodiment of the present invention. In this embodiment, the PEP 200 has a platform environment 210, which includes the hardware and software operating system. The PEP 200 also includes local area network (LAN) interfaces 220 and wide area network (WAN) interfaces 230. In the example in FIG. 1, the network gateway 120 may establish the TCP connections with the IP hosts 110, via a local LAN interface 220 and may establish the backbone connection with the network gateway 140 via a WAN interface 230. The PEP platform environment 210 may also include general functional modules: routing module 240, buffer management module 250, event management. module 260, and parameter management module 270. As illustrated in FIG. 2, the network gateway also includes a TCP spoofing kernel (TSK) 280, a backbone protocol kernel (BPK) 282, a prioritization kernel (PK) 284, and a path selection kernel (PSK) 286. These four kernels essentially make up the functionality of the performance enhancing proxy 200.

The platform environment 210 performs a number of functions. One such function is to shield the various PEP kernels 280, 282, 284, 286 from implementation specific constraints. That is, the platform environment 210 performs functions that the various PEP kernels 280, 282, 284, 286 cannot perform directly because the implementation of the function is platform specific. This arrangement has the advantageous effect of hiding platform specific details from the PEP kernels 280, 282, 284, 286, making the PEP kernels more portable. An example of a platform specific function is the allocation of a buffer. In some platforms, buffers are created as they are needed, while in other platforms, buffers are created at start-up and organized into linked lists for later use. It is noted that platform specific functions are not limited to functions generic to all of the kernels 280, 282, 284, 286. A function specific to a particular kernel, for example, the allocation of a control block for TCP spoofing, may also be implemented in the platform environment to hide platform specific details from the kernel.

In one exemplary embodiment, the platform environment 210 provides the task context in which the PEP kernels 280, 282, 284, 286 run. In another exemplary embodiment, all PEP kernels 280, 282, 284, 286 can run in the same task context for efficiency; however, this is not required.

Furthermore, the platform environment 210, in an exemplary embodiment, provides an interface between the PEP functionality (embodied in kernels 280, 282, 284, 286) and the other functionality of the network gateway 120, 140. The platform environment 210 may provide the interface between the PEP functionality and the routing function 240, as seen in FIG. 2. It is noted that the platform specific functions illustrated in FIG. 2 are examples and are not considered an exhaustive list. It is further noted that the PEP kernels shown touching each other (280, 282 and 284, 286) in FIG. 2 may have a direct procedural interface to each other. Further, the kernels 280, 282, 284, 286 may include direct interfaces to improve performance, as opposed to routing everything through the platform environment 210 (as shown in FIG. 2).

In addition to the PEP kernels 280, 282, 284, and 286, the PEP end point platform 210 may utilize a data compression kernel (CK) 290 and an encryption kernel (EK) 292. These kernels 280, 282, 284, 286, 290, and 292, as described above, facilitate communication between the two groups of hosts 110, 150, by performing a variety of performance enhancing functions, either singly or in combination. These performance enhancing functions include selective TCP spoofing, three-way handshake spoofing, local data acknowledgement, TCP connection to backbone connection multiplexing, data compression/encryption, prioritization, and path selection.

Selective TCP Spoofing is performed by the TSK 280 and includes a set of user configurable rules that are used to determine which TCP connections should be spoofed. Selective TCP spoofing improves performance by not tying up TCP spoofing-related resources, such as buffer space, control blocks, etc., for TCP connections for which the user has determined that spoofing is not beneficial or required and by supporting the use of tailored parameters for TCP connections that are spoofed.

In particular, the TSK 280 discriminates among the various TCP connections based on the applications using them. That is, TSK 280 discriminates among these TCP connections to determine which connection should be spoofed as well as the manner in which the connection is spoofed; e.g., whether to spoof the three-way handshake, the particular timeout parameters for the spoofed connections, etc. TCP spoofing is then performed only for those TCP connections that are associated with applications for which high throughput or reduced connection startup latency (or both) is required. As a result, the TSK 280 conserves TCP spoofing resources for only those TCP connections for which high throughput or reduced connection startup latency (or both) is required. Further, the TSK 280 increases the total number of TCP connections which can be active before running out of TCP spoofing resources, since any active TCP connections which do not require high throughput are not allocated resources.

One criterion for identifying TCP connections of applications for which TCP spoofing should and should not be performed is the TCP port number field contained in the TCP packets being sent. In general, unique port numbers are assigned to each type of application. Which TCP port numbers should and should not be spoofed can be stored in the TSK 280. The TSK 280 is also re-configurable to allow a user or operator to reconfigure the TCP port numbers which should and should not be spoofed. The TSK 280 also permits a user or operator to control which TCP connections are to be spoofed based on other criteria. In general, a decision on whether to spoof a TCP connection may be based on any field within a TCP packet. The TSK 280 permits a user to specify which fields to examine and which values in these fields identify TCP connections that should or should not be spoofed. Another example of a potential use for this capability is for the user or operator to select the IP address of the TCP packet in order to control for which users TCP spoofing is performed. The TSK 280 also permits a user to look at multiple fields at the same time. As a result, the TSK 280 permits a user or operator to use multiple criteria for selecting TCP connections to spoof. For example, by selecting both the IP address and the TCP port number fields, the system operator can enable TCP spoofing for only specific applications from specific users.

The user configurable rules may include five exemplary criteria which can be specified by the user or operator in producing a selective TCP spoofing rule: Destination IP address; Source IP address; TCP port numbers (which may apply to both the TCP destination and source port numbers); TCP options; and IP differentiated services (DS) field. However, as indicated above, other fields within the TCP packet may be used.

As discussed above, in addition to supporting selective TCP spoofing rules for each of these criterion, AND and OR combination operators can be used to link criteria together. For example, using the AND combination operator, a rule can be defined to disable TCP spoofing for FTP data received from a specific host. Also, the order in which the rules are specified may be significant. It is possible for a connection to match the criteria of multiple rules. Therefore, the TSK 280 can apply rules in the order specified by the operator, taking the action of the first rule that matches. A default rule may also be set which defines the action to be taken for TCP connections which do not match any of the defined rules. The set of rules selected by the operator may be defined in a selective TCP spoofing selection profile.

As an example, assuming sufficient buffer space has been allocated to spoof five TCP connections, if four low speed applications (i.e., applications which, by their nature, do not require high speed) bring up connections along with one high speed application, the high speed connection has access to only ⅕ of the available spoofing buffer space. Further, if five low speed connections are brought up before the high speed connection, the high speed connection cannot be spoofed at all. Using the TSK 280 selective spoofing mechanism, the low speed connections are not allocated any spoofing buffer space. Therefore, the high speed connection always has access to all of the buffer space, improving its performance with respect to an implementation without the selective TCP spoofing feature of the TSK 280.

The TSK 280 also facilitates spoofing of the conventional three-way handshake. Three-Way Handshake Spoofing involves locally responding to a connection request to bring up a TCP connection in parallel with forwarding the connection requests across the backbone link 130 (FIG. 1). This allows the originating IP host (for example, 110) to reach the point of being able to send the data it must send at local speeds, i.e. speeds that are independent of the latency of the backbone link 130. Three-way Handshake Spoofing allows the data that the IP host 110 needs to send to be sent to the destination IP host 150 without waiting for the end-to-end establishment of the TCP connection. For backbone links 130 with high latency, this significantly reduces the time it takes to bring up the TCP connection and, more importantly, the overall time it takes to get a response (from an IP host 150) to the data the IP host 110 sends.

A specific example in which this technique is useful relates to an Internet web page access application. With three-way handshake spoofing, an IP host's request to retrieve a web page can be on its way to a web server without waiting for the end-to-end establishment of the TCP connection, thereby reducing the time it takes to download the web page.

With Local Data Acknowledgement, the TSK 280 in the network gateway 120 (for example) locally acknowledges data segments received from the IP host 110. This allows the sending IP host 110 to send additional data immediately. More importantly, TCP uses received acknowledgements as signals for increasing the current TCP window size. As a result, local sending of the acknowledgements allows the sending IP host 110 to increase its TCP window at a much faster rate than supported by end to end TCP acknowledgements. The TSK 280 (the spoofer) takes on the responsibility for reliable delivery of the data which it has acknowledged.

In the BPK 282, multiple TCP connections are multiplexed onto and carried by a single backbone connection. This improves system performance by allowing the data for multiple TCP connections to be acknowledged by a single backbone connection acknowledgement (ACK), significantly reducing the amount of acknowledgement traffic required to maintain high throughput across the backbone link 130. In addition, the BPK 282 selects a backbone connection protocol that is optimized to provide high throughput for the particular link. Different backbone connection protocols can be used by the BPK 282 with different backbone links without changing the fundamental TCP spoofing implementation. The backbone connection protocol selected by the BPK 282 provides appropriate support for reliable, high speed delivery of data over the backbone link 130, hiding the details of the impairments (for example high latency) of the link from the TCP spoofing implementation.

The multiplexing by the BPK 282 allows for the use of a backbone link protocol which is individually tailored for use with the particular link and provides a technique to leverage the performance of the backbone link protocol with much less dependency upon the individual performance of the TCP connections being spoofed than conventional methods. Further, the ability to tailor the backbone protocol for different backbone links makes the present invention applicable to many different systems.

The PEP 200 may optionally include a data compression kernel 290 for compressing TCP data and an encryption kernel 292 for encrypting TCP data. Data compression increases the amount of data that can be carried across the backbone connection. Different compression algorithms can be supported by the data compression kernel 290 and more than one type of compression can be supported at the same time. The data compression kernel 290 may optionally apply compression on a per TCP connection basis, before the TCP data of multiple TCP connections is multiplexed onto the backbone connection or on a per backbone connection basis, after the TCP data of multiple TCP connections has been multiplexed onto the backbone connection. Which option is used is dynamically determined based on user configured rules and the specific compression algorithms being utilized. Exemplary data compression algorithms are disclosed in U.S. Pat. Nos. 5,973,630, 5,955,976, the entire contents of which are hereby incorporated by reference. The encryption kernel 292 encrypts the TCP data for secure transmission across the backbone link 130. Encryption may be performed by any conventional technique. It is also understood that the corresponding spoofer (in the example outlined above, the network gateway 140) includes appropriate kernels for decompression and decryption, both of which may be performed by any conventional technique.

The PK 284 provides prioritized access to the backbone link capacity. For example, the backbone connection can actually be divided into N (N>1) different sub-connections, each having a different priority level. In one exemplary embodiment, four priority levels can be supported. The PK 284 uses user-defined rules to assign different priorities, and therefore different sub-connections of the backbone connection, to different TCP connections. It should be noted that PK 284 may also prioritize non-TCP traffic (e.g., UDP (User Datagram Protocol) traffic) before sending the traffic across the backbone link 130.

The PK 284 also uses user-defined rules to control how much of the backbone link 130 capacity is available to each priority level. Exemplary criteria which can be used to determine priority include the following: Destination IP address; Source IP address; IP next protocol; TCP port numbers (which may apply to both the TCP destination and source port numbers); UDP port numbers (which may apply to both the UDP destination and source port numbers); and IP differentiated services (DS) field. The type of data in the TCP data packets may also be used as a criterion. For example, video data could be given highest priority. Mission critical data could also be given high priority. As with selective TCP spoofing, any field in the IP packet can be used by PK 284 to determine priority. However, it should be noted that under some scenarios the consequence of using such a field may cause different IP packets of the same flow (e.g., TCP connection) to be assigned different priorities; these scenarios should be avoided.

As mentioned above, in addition to supporting selective prioritization rules for each of these criteria, AND and OR combination operators can be used to link criteria together. For example, using the AND combination operator, a rule can be defined to assign a priority for SNMP data received from a specific host. Also, the order in which the rules are specified may be significant. It is possible for a connection to match the criteria of multiple rules. Therefore, the PK 284 can apply rules in the order specified by the operator, taking the action of the first rule that matches. A default rule may also be set which defines the action to be taken for IP packets which do not match any of the defined rules. The set of rules selected by the operator may be defined in a prioritization profile.

As regards the path selection functionality, the PSK 286 is responsible for determining which path an IP packet should take to reach its destination. The path selected by the PSK 286 can be determined by applying path selection rules. The PSK 286 also determines which IP packets should be forwarded using an alternate path and which IP packets should be dropped when one or more primary paths fail. Path selection parameters can also be configured using profiles. The path selection rules may be designed to provide flexibility with respect to assigning paths while making sure that all of the packets related to the same traffic flow (e.g., the same TCP connection) take the same path (although it is also possible to send segments of the same TCP connection via different paths, this segment "splitting" may have negative side effects). Exemplary criteria that can be used to select a path include the following: priority of the IP packet as set by the PK 284 (should be the most common criterion): Destination IP address; Source IP address; IP next protocol; TCP port numbers (which may apply to both the TCP destination and source port numbers); UDP port numbers (which may apply to both the UDP destination and source port numbers); and IP differentiated services (DS) field.

Similar to selective TCP spoofing and prioritization, the PSK 284 may determine a path by using any field in the IP packet.

As with the prioritization criteria (rules) the AND and OR combination operators can be used to link criteria together. For example, using the AND combination operator, a rule can be defined to select a path for SNMP data received from a specific host. Also, the order in which the rules are specified may be significant. It is possible for a connection to match the criteria of multiple rules. Therefore, the PSK 286 can apply rules in the order specified by the operator, taking the action of the first rule that matches. A default rule may also be set which defines the action to be taken for IP packets which do not match any of the defined rules. The set of rules selected by the operator may be defined in a path selection profile.

By way of example, a path selection rule may select the path based on any of the following path information in which IP packets match the rule: a primary path, a secondary path, and a tertiary path. The primary path is be specified in any path selection rule. The secondary path is used only when the primary path has failed. If no secondary path is specified, any IP packets that match the rule can be discarded when the primary path fails. The tertiary path is specified only if a secondary path is specified. The tertiary path is selected if both the primary and secondary paths have failed. If no tertiary path is specified, any IP packets that match the rule can be discarded when both the primary and secondary paths fail. Path selection may be generalized such that the path selection rule can select up to N paths where the Nth path is used only if the (N-1)th path fails. The example above where N=3 is merely illustrative, although N is typically a fairly small number.

By way of example, the operation of the system 100 is described as follows. First, a backbone connection is established between the PEPs 200 of two network gateways 120, 140 (i.e., the two spoofers), located at each end of the backbone link 130 for which TCP spoofing is desired. Whenever an IP host 110 initiates a TCP connection, the TSK 280 of the PEP 200 local to the IP host 110 checks its configured selective TCP spoofing rules. If the rules indicate that the connection should not be spoofed, the PEP 200 allows the TCP connection to flow end-to-end unspoofed. If the rules indicate that the connection should be spoofed, the spoofing PEP 200 locally responds to the IP host's TCP three-way handshake. In parallel, the spoofing PEP 200 sends a message across the backbone link 130 to its partner network gateway 140 asking it to initiate a TCP three-way handshake with the IP host 150 on its side of the backbone link 130. Data is then exchanged between the IP host 110, 150 with the PEP 200 of the network gateway 120 locally acknowledging the received data and forwarding it across the backbone link 130 via the high speed backbone connection, compressing the data as appropriate based on the configured compression rules. The priority of the TCP connection is determined when the connection is established. The BPK 282 can multiplex the connection with other received connections over a single backbone connection, the PK 284 determines the priority of the connection and the PSK 286 determines the path the connection is to take.

The PEP 200, as described above, advantageously improves network performance by allocating TCP spoofing-related resources, such as buffer space, control blocks, etc., only to TCP connections for which spoofing is beneficial; by spoofing the three-way handshake to decrease data response time; by reducing the number of ACKs which are transmitted by performing local acknowledgement and by acknowledging multiple TCP connections with a single ACK; by performing data compression to increase the amount of data that can be transmitted; by assigning priorities to different connections; and by defining multiple paths for connections to be made.

Figure 3:
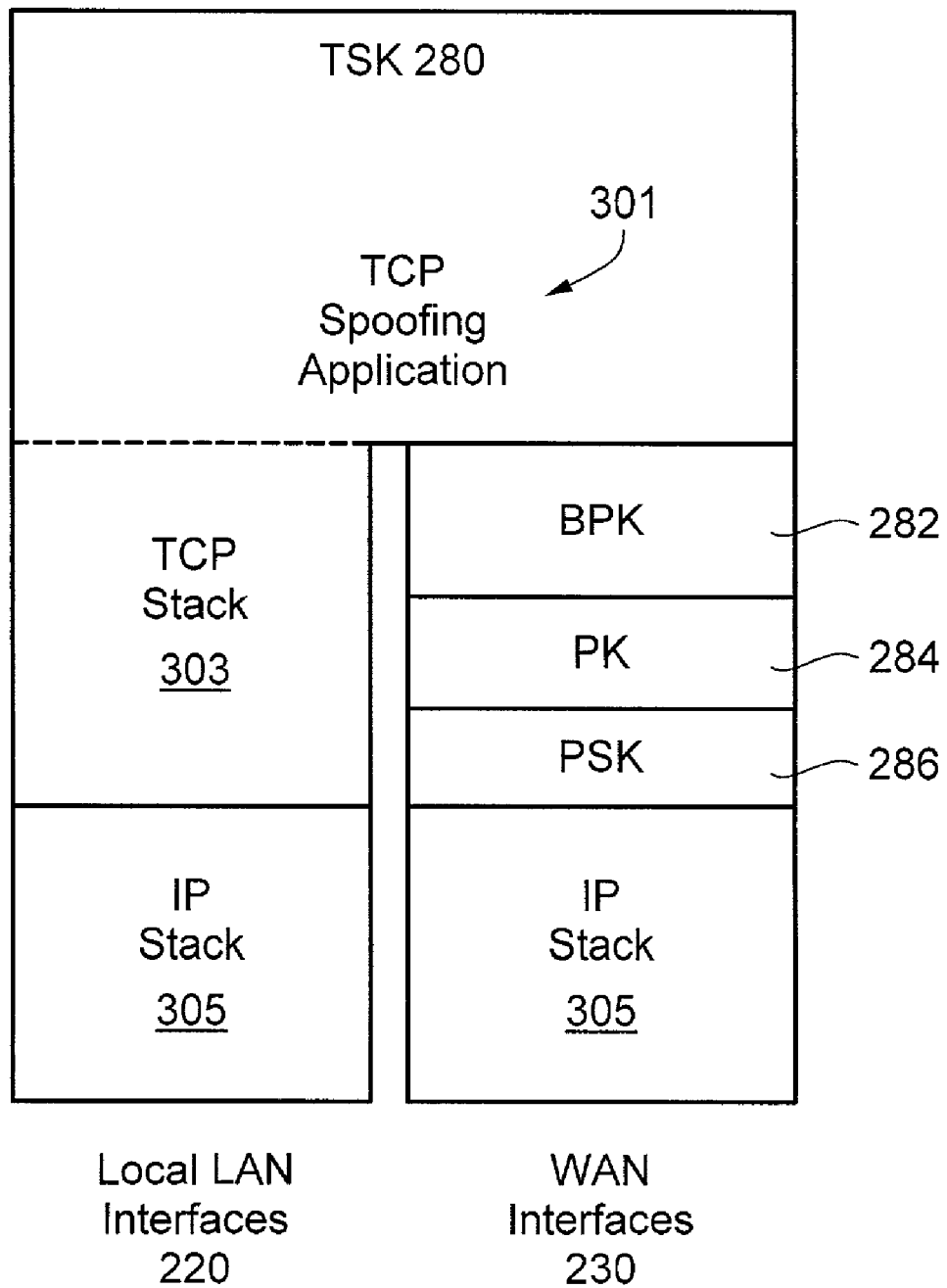
FIG. 3 is a diagram of a TCP Spoofing Kernel (TSK) utilized in the environment of FIG. 2.

FIG. 3 shows an exemplary stack, which illustrates the relationship between the TCP stack and the PEP kernels 280, 282, 284, 286 of the present invention. The TSK 280 is primarily responsible for functions related to TCP spoofing. The TSK 280, in an exemplary embodiment, includes two basic elements: a transport layer that encompasses a TCP stack 303 and an IP stack 305; and a TCP spoofing application 301. The transport layer is responsible for interacting with the TCP stacks (e.g., 303) of IP hosts 110 connected to a local LAN interface 220 of a PEP 210.

The TSK 280 implements the TCP protocol, which includes the appropriate TCP state machines and terminates spoofed TCP connections. The TCP spoofing application 301 rests on top of the transport layer and act as the application that receives data from and sends data to the IP hosts 110 applications. Because of the layered architecture of the protocol, the TCP spoofing application 301 isolates the details of TCP spoofing from the transport layer, thereby allowing the transport layer to operate in a standard fashion.

As shown in FIG. 3, the TCP spoofing application 301 can also interface to the BPK 282 associated with the WAN interfaces 230. The BPK 282 performs backbone protocol maintenance, implementing the protocol by which the network gateways 120,140 (in FIG. 1) communicate. The BPK 282 provides reliable delivery of data, uses a relatively small amount of acknowledgement traffic, and supports generic backbone use (i.e., use not specific to the TSK 280). An example of a protocol implemented by BPK 282 is the reliable data protocol (RDP).

The BPK 282 lies above the PK 284 and the PSK 286, according to an exemplary embodiment. The PK 284 is responsible for determining the priority of IP packets and then allocating transmission opportunities based on priority. The PK 284 can also control access to buffer space by controlling the queue sizes associated with sending and receiving IP packets. The PSK 286 determines which path an IP packet should take to reach its destination. The path selected by the PSK 286 can be determined applying path selection rules. PSK 286 may also determine which IP packet should be forwarded using an alternate path and which packets should be dropped when one or more primary paths fail. It is noted that the above arrangement is hereby exemplary; other arrangements would be evident to one skilled in the art.

Figure 4B:
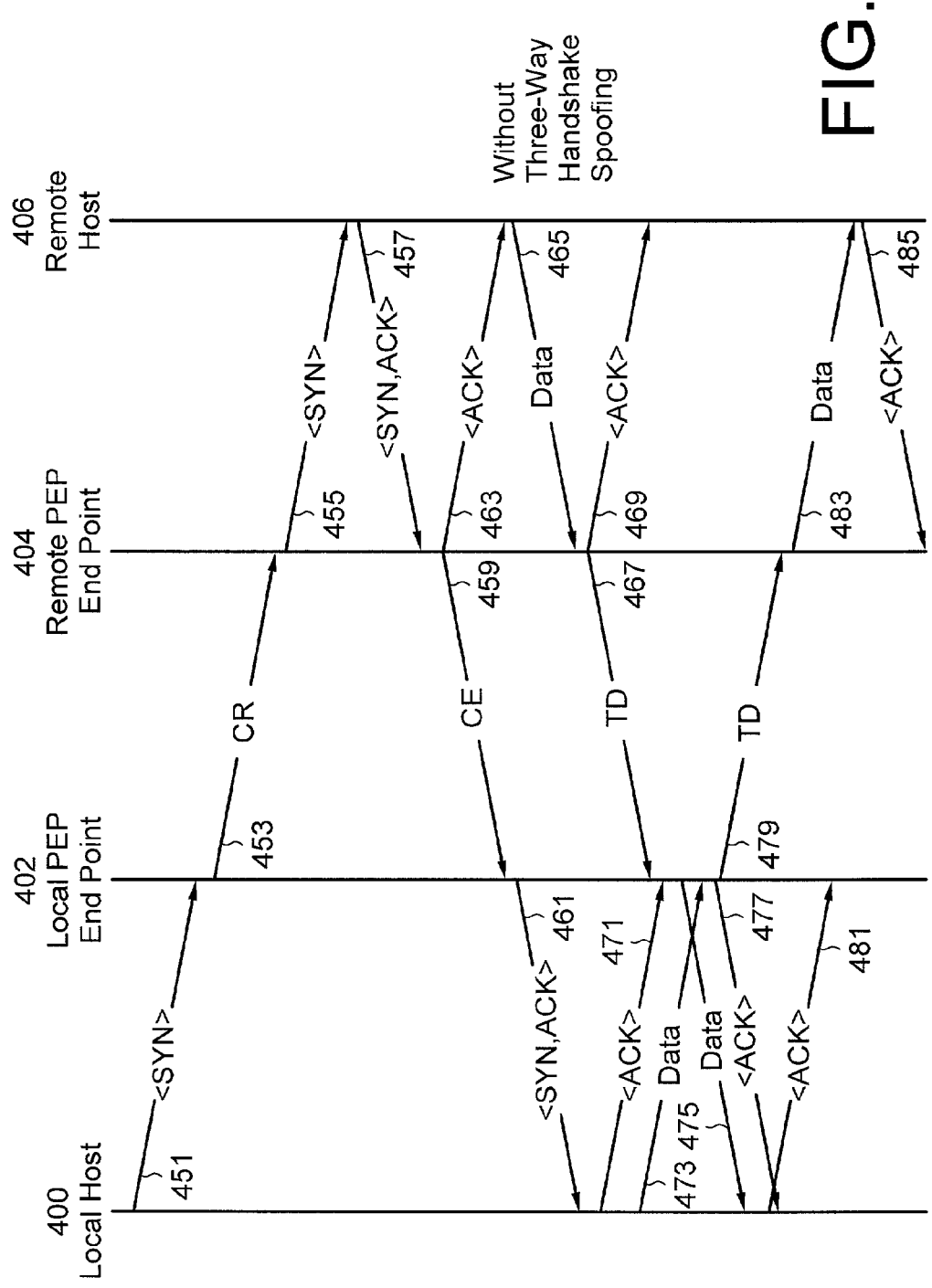

FIGS. 4A and 4B show flow diagrams of the establishment of a spoofed TCP connection utilizing three-way handshake spoofing and without three-way handshake spoofing, respectively. The TCP Spoofing Kernel 280 establishes a spoofed TCP connection when a TCP <SYN> segment is received from its local LAN or a Connection Request message from its TSK peer. It is noted that the three-way handshake spoofing may be disabled to support an end to end maximum segment size (MSS) exchange, which is more fully described below. For the purpose of explanation, the spoofed TCP connection establishment process is described with respect to a local host 400, a local PEP end point 402, a remote PEP end point 404, and a remote host 406. As mentioned previously, the TSK 280 within each of the PEP end points 402 and 404 provides the spoofing functionality.

In step 401, the local host 400 transmits a TCP <SYN> segment to the local PEP end point 402 at a local LAN interface 220. When a TCP segment is received from the local LAN interface 220, the platform environment 402 determines whether there is already a connection control block (CCB) assigned to the TCP connection associated with the TCP segment. If there is no CCB, the environment 402 checks whether the TCP segment is a <SYN> segment that is being sent to a non-local destination. If so, the <SYN> segment represents an attempt to bring up a new (non-local) TCP connection, and the environment 402 passes the segment to the TCP Spoofing Kernel 280 to determine the TCP connection's disposition. When a TCP <SYN> segment is received from the local LAN interface 220 for a new TCP connection, the TCP Spoofing Kernel 280 first determines if the connection should be spoofed. If the connection should be spoofed, TSK 280 uses (in an exemplary embodiment) the priority indicated in the selected TCP spoofing parameter profile and the peer index (provided by the environment 210 with the TCP <SYN> segment) to construct the handle of the backbone connection which should be used to carry this spoofed TCP connection. In the exemplary embodiment, the peer index is used as the 14 high order bits of the handle and the priority is used as the two low order bits of the handle. The backbone connection handle is then used (via the TSK control block (TCB) mapping table) to find the TCB associated with the backbone connection. TSK 280 of PEP end point 402 then checks whether the backbone connection is up. If the backbone connection is up, TSK 280 determines whether the number of spoofed TCP connections that are already using the selected backbone connection is still currently below the TCP connection control block (CCB) resource limit. The CCB resource limit is the smaller of the local number of CCBs (provided as a parameter by the platform environment 210) and the peer number of CCBs (received in the latest TSK peer parameters (TPP) message from the TSK peer) available for this backbone connection. If the number of connections is still below the limit, TSK 280 of PEP end point 402 assigns a unique TCP connection identifier (e.g., a free CCB mapping table entry index) to the connection and calls the environment 210 to allocate a TCP connection control block for the connection.

TSK 280 of PEP end point 402 returns the TCP <SYN> segment back to the environment 210 to be forwarded unspoofed if any of the above checks fail. In other words, the following conditions result in the TCP connection being unspoofed. First, if the selective TCP spoofing rules indicate that the connection should not be spoofed. Also, there is no backbone connection for the priority at which the TCP connection should be spoofed (indicated by the absence of a TCB for the backbone connection). No spoofing is performed if the backbone connection is down. Additionally, if the number of spoofed TCP connections that are already using the backbone connection reaches or exceeds a predetermined threshold, then no spoofing is performed. Further, if there is no CCB mapping table entry available or there is no CCB available from the CCB free pool, then the TCP connection is forwarded unspoofed. For the case in which there is no backbone connection, TSK 280 of PEP end point 402 may also post an event to alert the operator that there is a mismatch between the configured TCP spoofing parameter profiles and the configured set of backbone connections.

Continuing with the example, if all of the above checks pass, TSK 280 of PEP end point 402 writes the backbone connection handle into the buffer holding the TCP <SYN> segment. It is noted that this is not done until a CCB is successfully allocated by the platform environment 402, because the environment does not count the buffer unless a CCB is successfully allocated. TSK 280 then copies the parameters from the selected TCP spoofing parameter profile into the CCB. Consequently, relevant information (e.g., the maximum segment size that is advertised by the host (if smaller than the configured MSS), the initial sequence number, and etc.) is copied out of the TCP <SYN> segment and stored in the CCB. It is noted that the source and destination IP addresses and source and destination TCP port numbers will already have been placed into the CCB by the platform environment 402 when the CCB was allocated; the environment 402 uses this information to manage CCB hash function collisions.

After allocating and setting up the CCB, the TCP Spoofing Kernel 280 of PEP end point 402 constructs a Connection Request (CR) message, per step 403, and sends it to its TSK peer associated with the remote PEP end point 404. The CR message basically contains all of the information extracted from the TCP spoofing parameter profile and the TCP <SYN> segment and stored in the local CCB, e.g., the source and destination IP addresses, the source and destination TCP port numbers, the MSS value, etc., with the exception of fields that have only local significance, such as the initial sequence number. (The IP addresses and TCP port numbers are placed into a TCP connection header.) In other words, the CR message contains all of the information that the peer TSK of PEP end point 404 requires to set up its own CCB. To complete the local connection establishment, the TCP Spoofing Kernel 280 of the local PEP end point 402 sends a TCP <SYN,ACK> segment to the local host 400 in response to the <SYN> segment received, per step 405. TSK 280 of PEP end point 402 performs step 405 simultaneously with the step of sending the Connection Request message (i.e., step 403), if three-way handshake spoofing is enabled. Otherwise, TSK 280 of 402 waits for a Connection Established (CE) message from its TSK peer of the remote PEP end point 404 before sending the <SYN,ACK> segment. In an exemplary embodiment, TSK 280 of PEP end point 402 selects a random initial sequence number (as provided in IETF (Internet Engineering Task Force) RFC 793, which is incorporated herein by reference in its entirety) to use for sending data.

If three-way handshake spoofing is disabled, the MSS value sent in the <SYN,ACK> segment is set equal to the MSS value received in the CE message. If three-way handshake spoofing is enabled, the MSS value is determined from the TCP spoofing parameter profile selected for the connection (and the configured path maximum transmission unit (MTU)). For this case, TSK 280 of PEP end point 402 then compares the MSS value received in the Connection Established message, when it arrives, to the value it sent to the local host in the TCP <SYN,ACK> segment. If the MSS value received in the CE message is smaller than the MSS value sent to the local host, a maximum segment size mismatch exists. (If an MSS mismatch exists, TSK may need to adjust the size of TCP data segments before sending them.) After sending the TCP <SYN,ACK> segment (step 405), TSK 280 of the local PEP end point 402 is ready to start accepting data from the local host 400. In step 407, the local host 400 transmits an <ACK> segment to the TSK 280 of PEP end point 402; thereafter, the local host forwards, as in step 409 data to the TSK 280 of PEP end point 402 as well. When three-way handshake spoofing is being used, TSK 280 does not need to wait for the Connection Established message to arrive from its TSK peer before accepting and forwarding data. As seen in FIG. 4A, in step 411, TSK 280 of the local PEP end point 402 sends an <ACK> segment to the local host and simultaneously sends the TCP data (TD) from the local host 400 to the peer TSK of PEP end point 404 (per step 413) prior to receiving a CE message from the peer TSK of PEP end point 404.

However, TSK 280 of PEP end point 402 does not accept data from its TSK peer of PEP end point 404 until after the CE message has been received. TSK 280 of PEP end point 402 does not forward any data received from its TSK peer of PEP end point 404 to the local host 400 until it has received the TCP <ACK> segment indicating that the local host has received the <SYN,ACK> segment (as in step 407).

When a Connection Request message is received from a peer TSK (step 403), the TCP Spoofing Kernel 280 allocates a CCB for the connection and then stores all of the relevant information from the CR message in the CCB. TSK 280 of PEP end point 404 then uses this information to generate a TCP <SYN> segment, as in step 415, to send to the remote host 406. The MSS in the <SYN> segment is set to the value received from the TSK peer of PEP end point 404. When the remote host responds with a TCP <SYN,ACK> segment (step 417), TSK 280 of PEP end point 402 sends a Connection Established message to its TSK peer of the remote PEP end point 404 (step 419), including in the CE message the MSS that is sent by the local host in the <SYN,ACK> segment. TSK 280 of PEP end point 402 also responds, as in step 421, with a TCP <ACK> segment to complete the local three-way handshake. The peer TSK of PEP end point 404 then forwards the data that is received from TSK 280 to the host, per step 423. Concurrently, in step 425, the remote host 406 sends data to the peer TSK of PEP end point 404, which acknowledges receipt of the data by issuing an <ACK> segment to the remote PEP end point 404, per step 427. Simultaneously with the acknowledgement, the data is sent to TSK 280 of PEP end point 402 (step 429).

At this point, TSK 280 is ready to receive and forward data from either direction. TSK 280 forwards the data, as in step 431 to the local host, which, in turn, sends an <ACK> segment (step 433). If the data arrives from its TSK peer before a <SYN,ACK> segment response is received from the local host, the data is queued and then sent after the <ACK> segment is sent in response to the <SYN,ACK> segment (when it arrives).

Turning now to FIG. 4B, a spoofed TCP connection is established with the three-way handshake spoofing disabled. Under this scenario, the local host 400 transmits a TCP <SYN> segment, as in step 451, to the TSK 280 within the local PEP end point 402. Unlike the TCP connection establishment of FIG. 4A, the local PEP end point 402 does not respond to the a TCP <SYN> segment with a <SYN,ACK> segment, but merely forwards a CR message to the remote PEP end point 404 (step 453). Next, in step 455, sends a TCP <SYN> segment to the remote host 406. In response, the remote host 406 transmit a TCP <SYN,ACK> segment back to the remote PEP end point 404 (per step 457). Thereafter, the remote PEP end point 404, as in step 459, forwards a CE message to the local PEP end point 402, which subsequently issues a <SYN,ACK> segment to the local host 400, per step 461. Simultaneous with step 459, the remote PEP end point 404 issues an <ACK> segment to the remote host 406 (step 463).

Upon receiving the <ACK> segment, the remote host 406 may begin transmission of data, as in step 465. Once the PEP end point 404 receives the data from the remote host 406, the remote PEP end point 404 simultaneously transmits, as in step 467, the TD message to the local PEP end point 402 and transmits an <ACK> segment to the remote host 406 to acknowledge receipt of the data (step 469).

Because the local host 400 has received a <SYN,ACK> segment from the local PEP end point 402, the local host 400 acknowledges the message, per step 471. Thereafter, the local host 400 transmits data to the local PEP end point 402. In this example, before the local PEP end point 402 receives the data from the local host 400, the local PEP end point 402 forwards the data that originated from the remote host 406 via the TD message (step 467) to the local host 400, per step 475.

In response to the data received (in step 473), the local PEP end point 402 issues an <ACK> segment, as in step 477, and forwards the data in a TD message to the remote PEP end point 404, per step 479. The local host 400 responds to the received data of step 475 with an <ACK> segment to the local PEP end point 402 (step 481). The remote PEP end point 404 sends the data from the local host 400, as in step 483, upon receipt of the TD message. After receiving the data, the remote host 406 acknowledges receipt by sending an <ACK> segment back to the remote PEP end point 404, per step 485.

FIG. 5 shows the flow of packets with the PEP architecture, according to one embodiment of the present invention. As shown, a communication system 500 includes a hub site (or local) PEP end point 501 that has connectivity to a remote site PEP end point 503 via a backbone connection. By way of example, at the hub site (or local site) and at each remote site, PEP end points 501 and 503 handle IP packets. PEP end point 501 includes an Internal IP packet routing module 501*a* that receives local IP packets and exchanges these packets with a TSK 501*b* and a BPK 501*c*. Similarly, the remote PEP end point 503 includes an internal IP packet routing module 503*a* that is in communication with a TSK 503*b* and a BPK 503*c*. Except for the fact that the hub site PEP end point 501 may support many more backbone protocol connections than a remote site PEP end point 503, hub and remote site PEP processing is symmetrical.

For local-to-WAN traffic (i.e., upstream direction), the PEP end point 501 receives IP packets from its local interface 220 (FIG. 2). Non-TCP IP packets are forwarded (as appropriate) to the WAN interface 230 (FIG. 2). TCP IP packets are internally forwarded to TSK 501*b*. TCP segments which belong to connections that are not be spoofed are passed back by the spoofing kernel 501*b* to the routing module 501*a* to be forwarded unmodified to the WAN interface 230. For spoofed TCP connections, the TCP spoofing kernel 501*a* locally terminates the TCP connection. TCP data that is received from a spoofed connection is passed from the spoofing kernel 501*a* to the backbone protocol kernel 501*c*, and then multiplexed onto the appropriate backbone protocol connection. The backbone protocol kernel 501*c* ensures that the data is delivered across the WAN.

For WAN-to-local traffic (i.e., downstream direction), the remote PEP end point 503 receives IP packets from its WAN interface 230 (FIG. 2). IP packets that are not addressed to the end point 503 are simply forwarded (as appropriate) to the local interface 220 (FIG. 2). IP packets addressed to the end point 503, which have a next protocol header type of "PBP" are forwarded to the backbone protocol kernel 503*c*. The backbone protocol kernel 503*c* extracts the TCP data and forwards it to the TCP spoofing kernel 503*b* for transmission on the appropriate spoofed TCP connection. In addition to carrying TCP data, the backbone protocol connection is used by the TCP spoofing kernel 501*b* to send control information to its peer TCP spoofing kernel 503*b* in the remote PEP end point 503 to coordinate connection establishment and connection termination.

Prioritization may be applied at four points in the system 500 within routing 501a and TSK 501b of PEP end point 501, and within routing 503a, and TSK 503b of PEP end point 503. In the upstream direction, priority rules are applied to the packets of individual TCP connections at the entry point to the TCP spoofing kernel 501b. These rules allow a customer to control which spoofed applications have higher and lower priority access to spoofing resources. Upstream prioritization is also applied before forwarding packets to the WAN. This allows a customer to control the relative priority of spoofed TCP connections with respect to unspoofed TCP connections and non-TCP traffic (as well as to control the relative priority of these other types of traffic with respect to each other). On the downstream side, prioritization is used to control access to buffer space and other resources in the PEP end point 503, generally and with respect to TCP spoofing.

At the hub (or local) site, the PEP end point 501 may be implemented in a network gateway (e.g. an IP Gateway) according to one embodiment of the present invention. At the remote site, the PEP end point 503 may be implemented in the remote site component, e.g. a satellite terminal such as a Multimedia Relay, a Multimedia VSAT or a Personal Earth Station (PES) Remote.

The architecture of system 500 provides a number of advantages. First, TCP spoofing may be accomplished in both upstream and downstream directions. Additionally, the system supports spoofing of TCP connection startup, and selective TCP spoofing with only connections that can benefit from spoofing actually spoofed. Further, system 500 enables prioritization among spoofed TCP connections for access to TCP spoofing resources (e.g., available bandwidth and buffer space). This prioritization is utilized for all types of traffic that compete for system resources.

With respect to the backbone connection, the system 500 is suitable for application to a satellite network as the WAN. That is, the backbone protocol is optimized for satellite use in that control block resource requirements are minimized, and efficient error recovery for dropped packets are provided. The system 500 also provides a feedback mechanism to support maximum buffer space resource efficiency. Further, system 500 provides reduced acknowledgement traffic by using a single backbone protocol ACK to acknowledge the data of multiple TCP connections.

Figure 6:
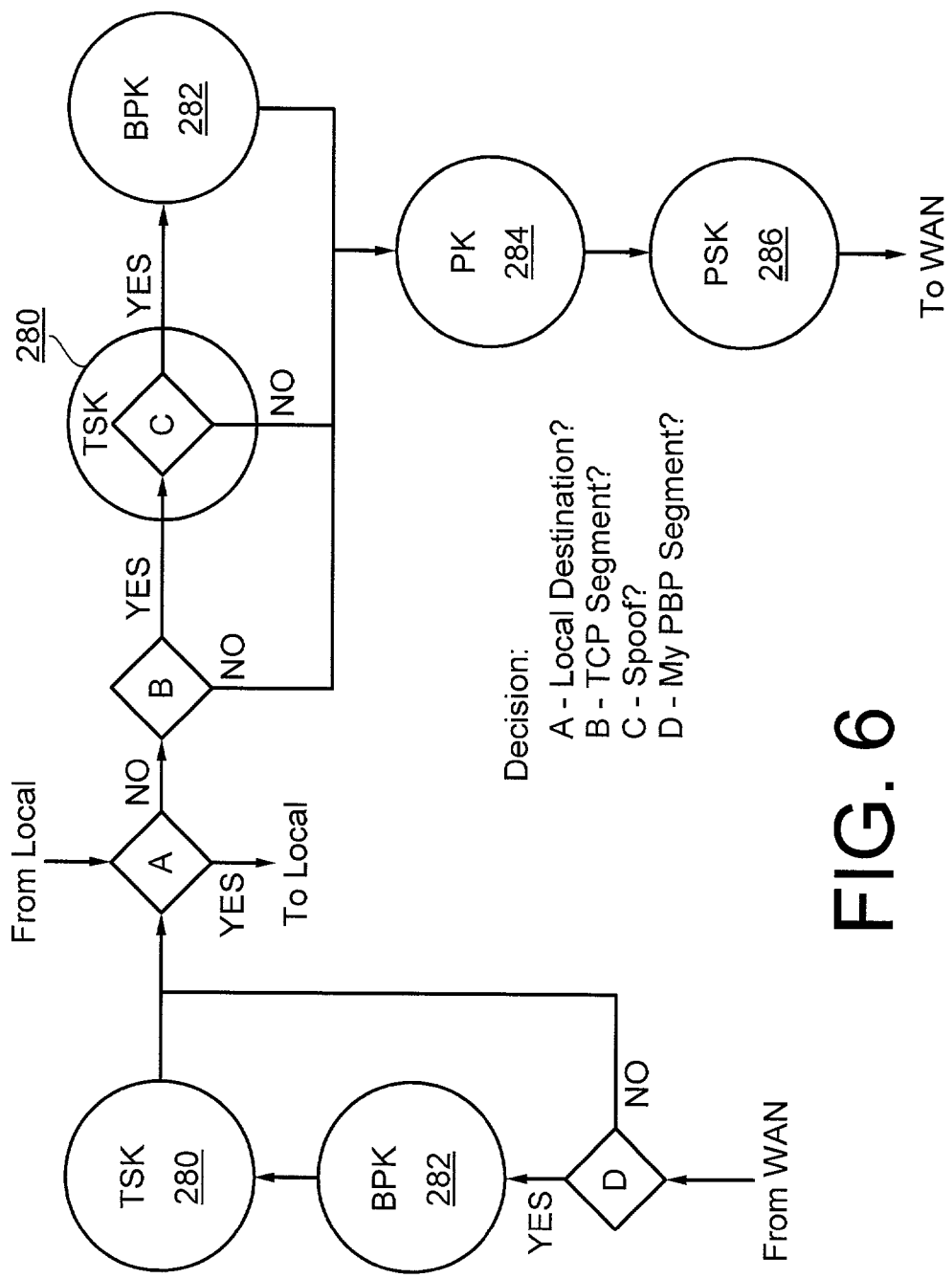
FIG. 6 is a diagram of an IP (Internet Protocol) packet flow through a PEP end point, in accordance with an embodiment of the present invention.

FIG. 6 illustrates the flow of IP packets through a PEP end point, according to an embodiment of the present invention. When IP packets are received at the local LAN interface 220, the PEP end point 210 determines (as shown by decision point A), whether the packets are destined for a host that is locally situated; if so, the IP packets are forwarded to the proper local LAN interface 220. If the IP packets are destined for a remote host, then the PEP end point 210 decides, per decision point B, whether the traffic is a TCP segment. If the PEP end point 210 determines that in fact the packets are TCP segments, then the TSK 280 determines whether the TCP connection should be spoofed. However, if the PEP end point 210 determines that the packets are not TCP segments, then the BPK 282 processes the traffic, along with the PK 284 and the PSK 286 for eventual transmission out to the WAN. It should be noted that the BPK 282 does not process unspoofed IP packets; i.e., the packets flow directly to PK 284. As seen in FIG. 6, traffic that is received from the WAN interface 230 is examined to determine whether the traffic is a proper PBP segment (decision point D) for the particular PEP end point 210; if the determination is in the affirmative, then the packets are sent to the BPK 282 and then the TSK 280.

Routing support includes routing between the ports of the PEP End Point 210 (FIG. 2), e.g., from one Multimedia VSAT LAN port to another. Architecturally, the functionalities of TCP spoofing, prioritization and path selection, fit between the IP routing functionality and the WAN. PEP functionality need not be applied to IP packets which are routed from local port to local port within the same PEP End Point 210. TCP spoofing, prioritization and path selection are applied to IP packets received from a local PEP End Point interface that have been determined to be destined for another site by the routing function.

Figure 7:
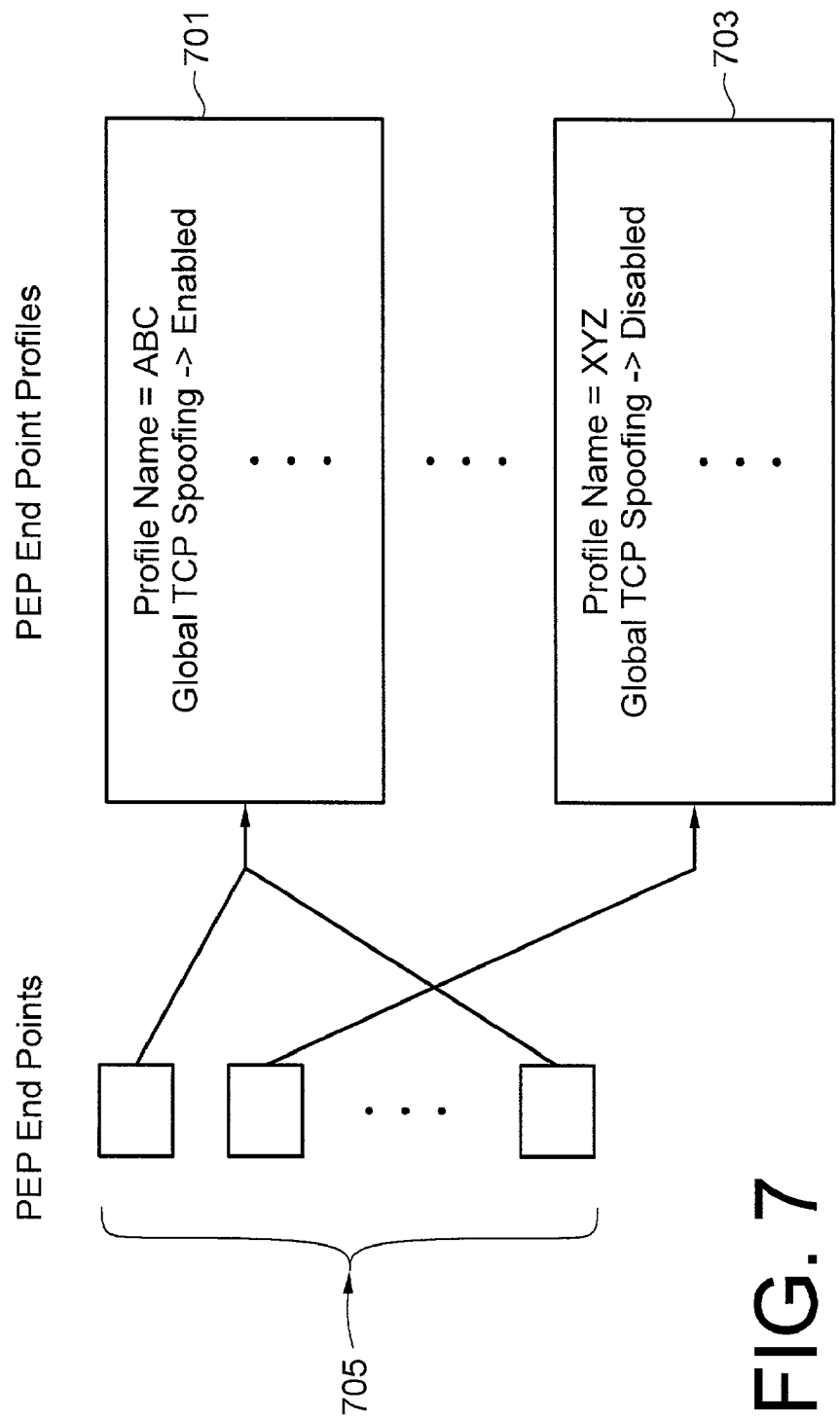
FIG. 7 is a diagram of PEP end point profiles utilized in the platform of FIG. 2.

FIG. 7 shows the relationship between PEP End Points and PEP End Point profiles, in accordance with an embodiment of the present invention. PEP parameters are primarily configured via a set of profiles 701 and 703, which are associated with one or more PEP end points 705. In an exemplary embodiment, PEP parameters are configured on a per PEP End Point basis, such as whether TCP spoofing is globally enabled. These parameters are configured in the PEP End Point profiles 701 and 703. It is noted that parameters that apply to specific PEP kernels may be configured via other types of profiles. Profiles 701 and 703 are a network management construct; internally, a PEP End Point 705 processes a set of parameters that are received via one or more files.

Whenever the PEP End Point 705 receives new parameters, the platform environment compares the new parameters to the existing parameters, figures out which of the PEP kernels are affected by the parameter changes, and then passes the new parameters to the affected kernels. In an exemplary embodiment, all parameters are installed dynamically. With the exception of parameters that are component specific (such as the IP addresses of a component), all parameters may be defined with default values.

As mentioned previously, the PEP end point 210 may be implemented in a number of different platforms, in accordance with the various embodiments of the present invention. These platforms may include an IP gateway, a Multimedia Relay, a Multimedia VSAT (Very Small Aperture Terminal), and a Personal Earth Station (PES) Remote, as shown in FIGS. 8–11, respectively. In general, as discussed in FIG. 2, the PEP end point 210 defines a local LAN interface 220 as an interface through which the PEP End Point 210 connects to IP hosts located at the site. A WAN interface 230 is an interface through which the PEP End Point 210 connects to other sites. It is noted that a WAN interface 230 can physically be a LAN port. FIGS. 8–11, below, describe the specific LAN and WAN interfaces of the various specific PEP End Point platforms. The particular LAN and WAN interfaces that are employed depend on which remote site PEP End Points are being used, on the configuration of the hub and remote site PEP End Points and on any path selection rules which may be configured.

Figure 8:
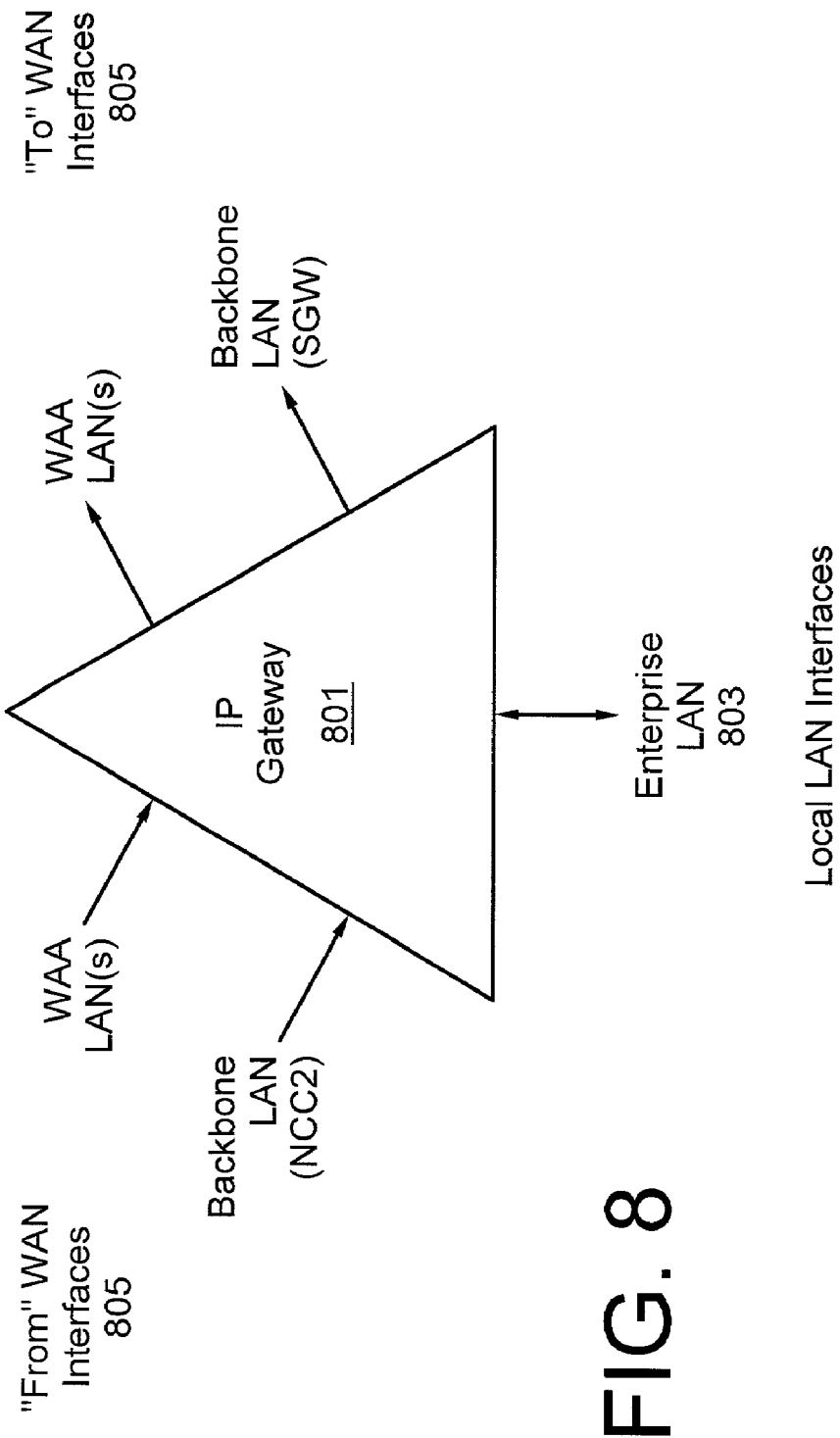
FIG. 8 is a diagram of the interfaces of a PEP end point implemented as an IP gateway, according to an embodiment of the present invention.

FIG. 8 shows the interfaces of the PEP end point implemented as an IP gateway, according to one embodiment of the present invention. By way of example, an IP Gateway 801 has a single local LAN interface, which is an enterprise interface 803. The IP Gateway 803 employs two WAN interfaces 805 for sending and receiving IP packets to and from remote site PEP End Points: a backbone LAN interface and a wide area access (WM) LAN interface.

The backbone LAN interface 805 is used to send IP packets to remote site PEP End Points via, for example, a Satellite Gateway (SGW) and a VSAT outroute. A VSAT outroute can be received directly by Multimedia Relays (FIG. 9) and Multimedia VSATs (FIG. 10) (and is the primary path used with these End Points); however, IP packets can also be sent to a PES Remote (FIG. 11) via a VSAT outroute.

Figure 9:
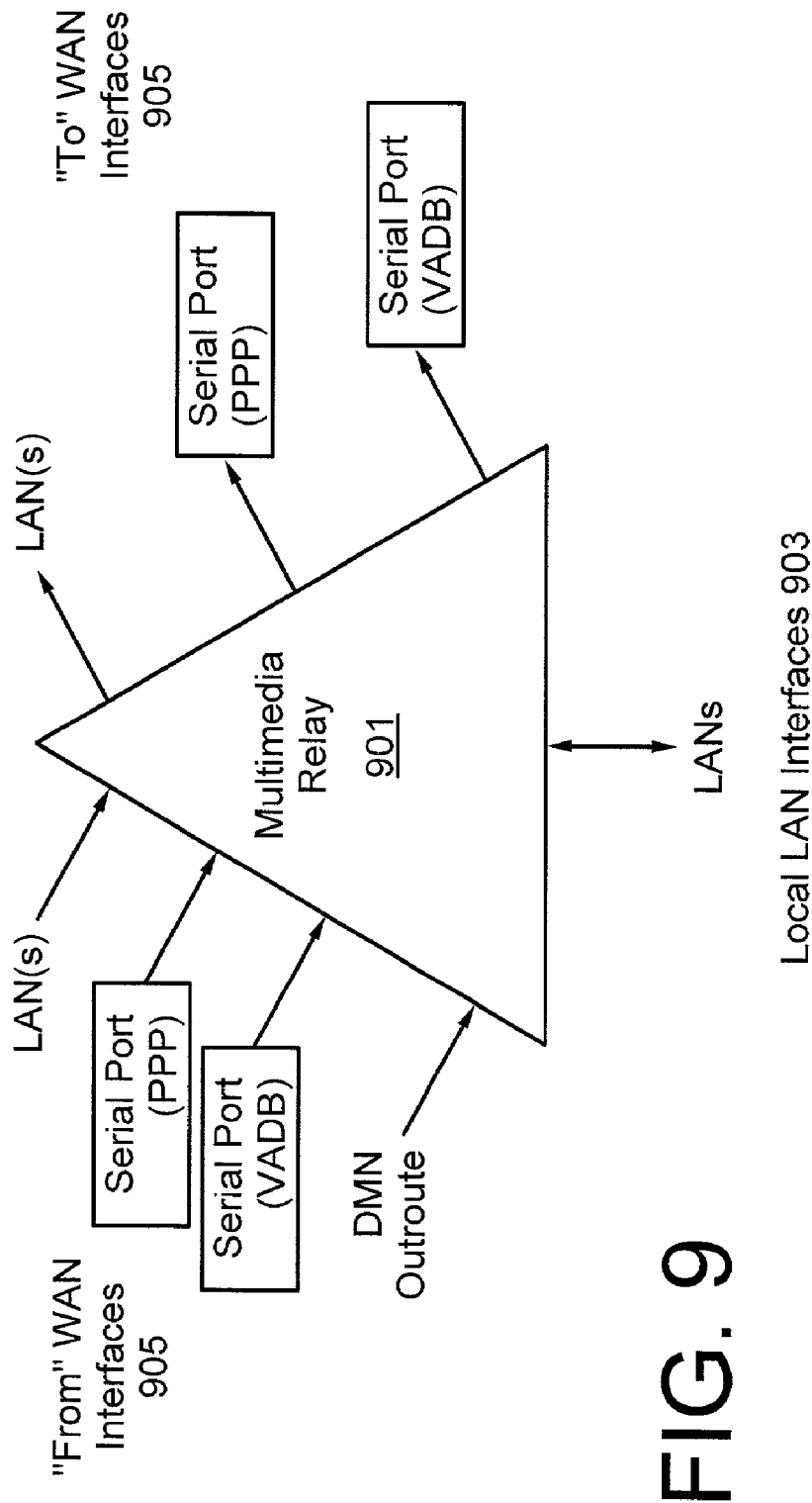
FIG. 9 is a diagram of the interfaces of a PEP end point implemented as a Multimedia Relay, according to an embodiment of the present invention.

FIG. 9 shows a Multimedia Relay implementation of a PEP end point, in accordance with an embodiment of the present invention. A Multimedia Relay has two or three local LAN interfaces 903A Multimedia Relay 901 has up to two WAN interfaces 905 for sending IP packets to hub site PEP End Points: one of its LAN interfaces and a PPP serial port interface, and four or five interfaces for receiving IP packets from hub site PEP End Points, a VSAT outroute, all of its LAN interfaces, and a PPP serial port interface. It is noted that a PPP (Point-to-Point Protocol) serial port interface and a LAN interface are generally not be used at the same time.

A Multimedia Relay 901 supports the use of all of its LAN interfaces 903 at the same time for sending and receiving IP packets to and from hub site PEP End Points. Further, a Multimedia Relay 905 supports the use of a VADB (VPN Automatic Dial Backup) serial port interface for sending and receiving IP packets to and from the hub site PEP End Points.

Figure 10:
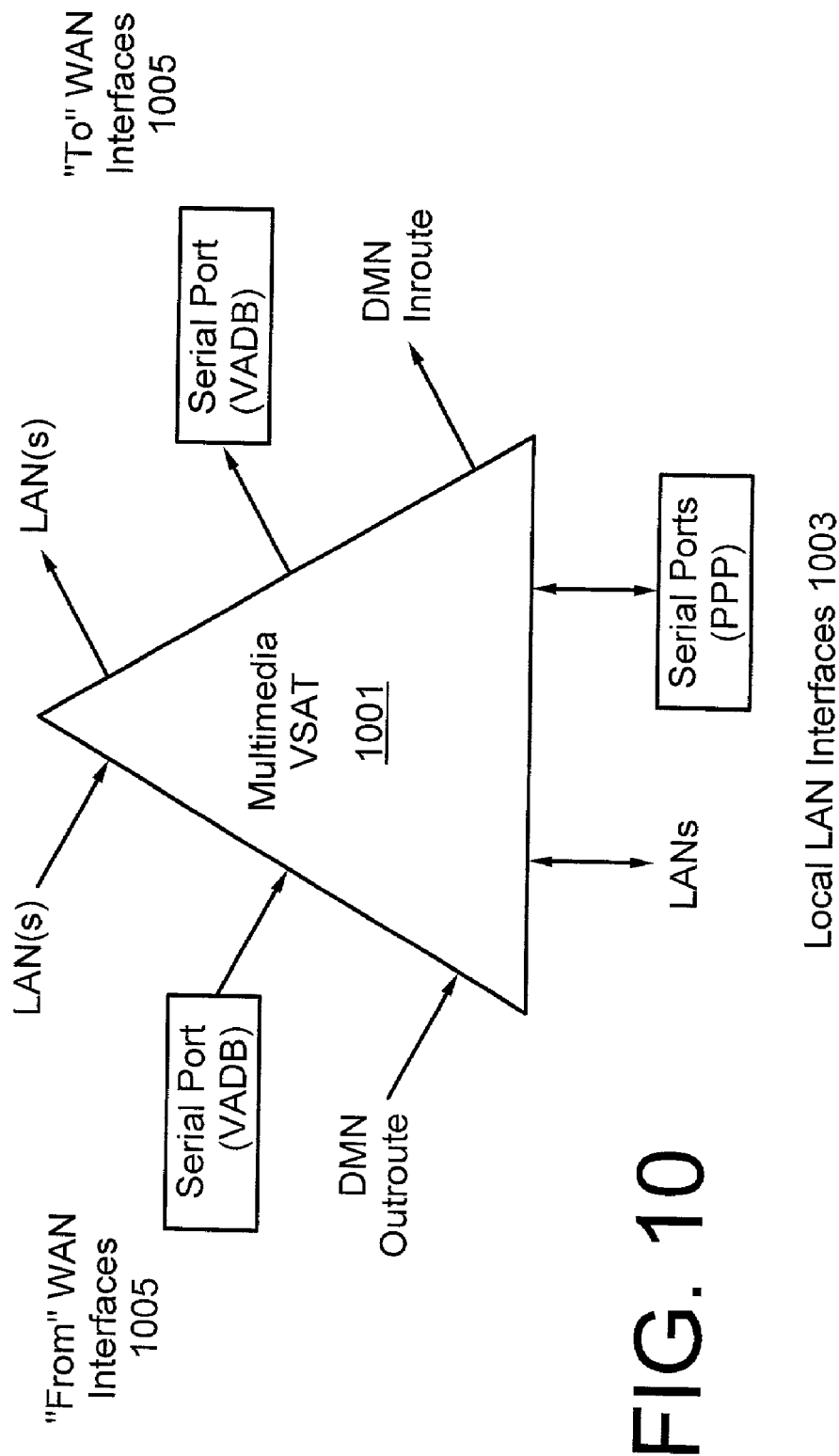
FIG. 10 is a diagram of the interfaces of a PEP end point implemented as a Multimedia VSAT (Very Small Aperture Terminal), according to an embodiment of the present invention.

FIG. 10 shows a Multimedia VSAT implementation of the PEP end point, according to one embodiment of the present invention. A Multimedia VSAT 1001, in an exemplary embodiment, has two local LAN interfaces 1003. Support for one or more local PPP serial port interfaces may be utilized. The Multimedia VSAT 1001 has two WAN interfaces 1005 for sending IP packets to hub site PEP End Points: a VSAT inroute and one of its LAN interfaces. The Multimedia VSAT 1001 thus has three interfaces for receiving IP packets from hub site PEP End Points, the VSAT outroute and both of its LAN interfaces 1003. A Multimedia VSAT 1003 may support uses of both of its LAN interfaces 1003 at the same time for sending and receiving IP packets to and from hub site PEP End Points. The Multimedia VSAT 1003 further supports the use of a VADB serial port interface for sending and receiving IP packets to and from the hub site PEP End Points.

Figure 11:
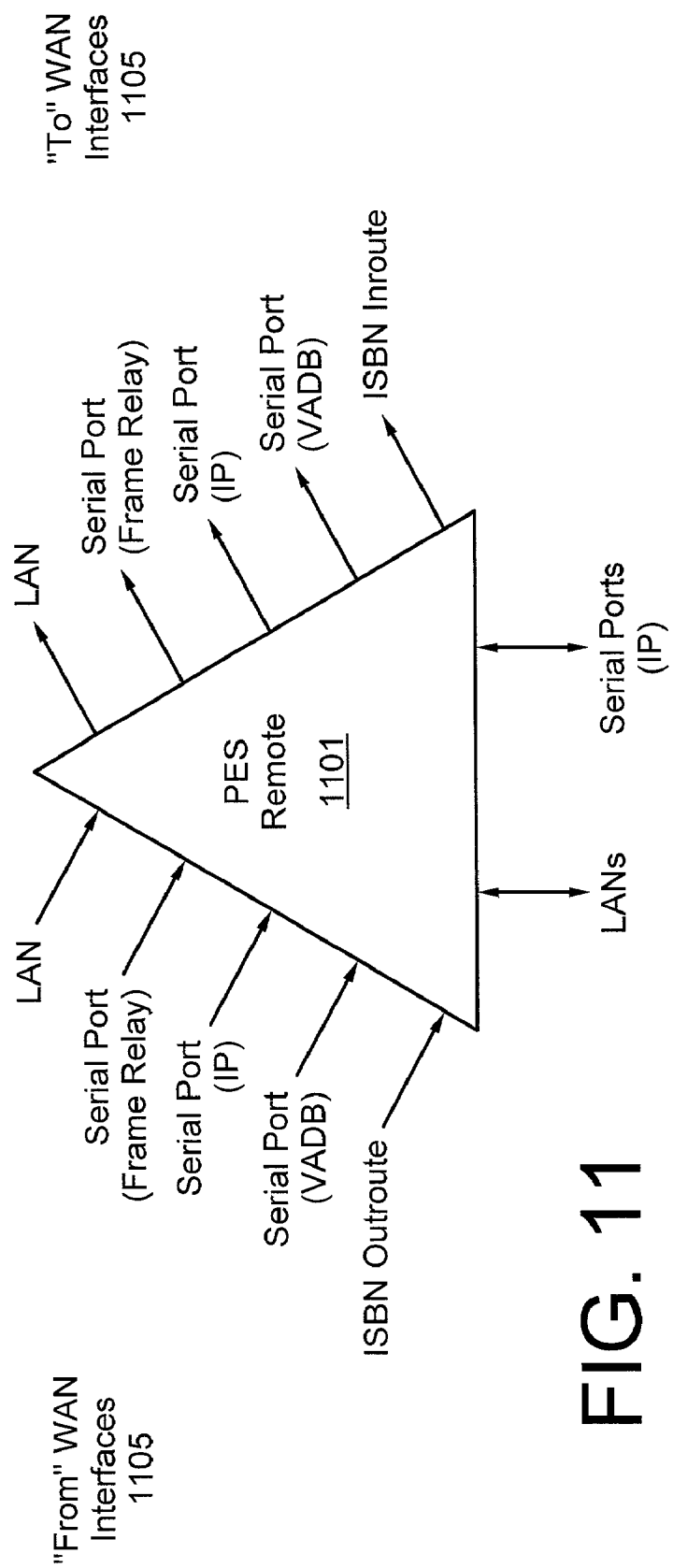
FIG. 11 is a diagram of the interfaces of a PEP end point implemented in an earth station, according to an embodiment of the present invention.

FIG. 11 shows a PES Remote implementation of a PEP end point, according to one embodiment of the present invention. A PES Remote 1101 may have a local LAN interface and/or several local IP (e.g. PPP, SLIP, etc.) serial port interfaces, collectively denoted as LAN interfaces 1103. The particular LAN interfaces 1103 depend on the specific PES Remote platform. PES Remote 1101, in an exemplary embodiment, has up to five WAN interfaces 1105 for sending IP packets to hub site PEP End Points, an ISBN inroute, a LAN interface, a VADB serial port interface, a Frame Relay serial port interface and an IP serial port interface, and up to five existing interfaces for receiving IP packets from hub site PEP End Points: an ISBN outroute, a LAN interface, a VADB serial port interface, a Frame Relay serial port interface, and an IP serial port interface. The physical Frame Relay serial port interface may be supporting multiple Permanent Virtual Circuits (PVCs); some of which are equivalent to local interfaces 1103 and some of which are WAN interfaces 1105.

In one embodiment, the Path Selection Kernel 286 (PSK 286) is responsible for determining which path an IP packet should take to reach its destination. An exemplary general design of the Path Selection Kernel 286 is described below. The path selected by PSK 286 can be determined by applying path selection rules. Exemplary rules are also described below. PSK 286 can also be responsible for determining which IP packets should be forwarded using an alternate path and which packets should be dropped when one or more primary paths fail. This may be controlled by a combination of path selection rules and path activation rules. Exemplary path activation rules are also described below.

PSK 286 parameters can be configured via profiles. Path selection rule parameters can defined in path selection profiles and path activation rule parameters can be defined in path activation profiles. Other PSK 286 parameters and which path selection profile is being used can be defined in PEP End Point profiles, such as the PEP end point profile 705, illustrated in FIG. 7. Which PEP End Point profile path activation profile and path activation profile are being used by a PEP End Point can be configured as part of an individual PEP End Point's specific configuration.

Profiles are usually a network management construct. PSK 286 can receive its parameters as a data structure passed to PSK 286 by the platform environment 210. The platform environment 210, in turn, can receive the parameters via files sent to it by a network manager.

PSK 286 can receive parameters from the platform environment 210 at startup and whenever the platform environment 210 receives new parameters which include changes to PSK related parameters. When PSK 286 receives new parameters, it can compare the new parameters to the existing parameters and then take actions to install the new parameters based on which parameters have changed. All parameters may be installed dynamically. If the use of a particular path changes, the change may take effect with the next IP packet that the PSK 286 processes.

The path that an IP packet takes can be determined by path selection rules configured for use by the PEP End Point 705. The path selection rules can be designed to provide flexibility with respect to assigning paths while making sure that all of the packets related to the same traffic flow (e.g. the same TCP connection) take the same path. A traffic splitting capability includes the ability to send some of the segments of a TCP connection via one path while sending other segments of the same TCP connection via a different path, i.e. the packets of the same TCP connection could be using two different paths at the same time.

There are at least two exemplary ways to implement traffic splitting. The first is to have the splitter simply split traffic based on available bandwidth for each path. The second technique is to use path selection rules associated with a field in the packet which varies for the same TCP connection. In one exemplary embodiment, the field could be the packet sequence number.

Management of path selection rules can be assigned to the Path Selection Kernel 286. There are at least seven criteria which may be specified by the operator in a path selection rule. These seven exemplary criteria are described below.

The first exemplary criteria is priority. A path can be selected based on the priority assigned to an IP packet by the Prioritization Kernel 284 or the TCP Spoofing Kernel 280. Priority may be the primary means for determining a path. Other criteria for selecting a path may be supported for two reasons. First, in some cases, finer granularity is required for selecting a path than is required for selecting a priority. For example, all SNMP traffic may be assigned the same priority but the SNMP traffic from different hosts might be assigned to different paths. Second, prioritization may not be required at all (i.e. all traffic has the same priority). But, path selection rules may be required to specify which traffic should be dropped when a primary path fails.

A second exemplary criteria is destination IP address. A path can be selected based on destination IP addresses. A mask is associated with each IP address to support multiple addresses matching a single rule. For example, a mask of 0.0.0.255 with an address of 0.0.0.1 could be used to select any IP address of the form x.x.x.1 and a mask of 255.255.255.0 with an address of 10.1.1.0 could be used to select all IP addresses in the 10.1.1.0 subnet. A mask of 0.0.0.0 can represent a "don't care" value for the IP address field, i.e., a mask of 0.0.0.0 matches all IP addresses.

A third exemplary criteria is source IP address. A path can be selected based on source IP addresses. As with destination IP addresses, a mask is associated with each IP address to support multiple addresses matching a single rule.

A fourth exemplary criteria is IP next protocol. A path can be selected based on the Protocol field in the IP header of the packet. The Protocol field is described in RFC 791, the entire contents of which are hereby incorporated by reference. Currently assigned IP header Protocol field numbers are tracked at:

http://www.isi.edu/in-notes/iana/assignments/protocol-numbers.

A value of 0 may be used as the "don't care" value for the IP protocol field, i.e., an IP protocol value of 0 in a rule matches all IP protocols. The operator can select paths for PEP Backbone Protocol IP packets using an exemplary IP next protocol value of 27;

A fifth exemplary criteria is TCP port number. A path can be selected (for IP packets containing TCP segments, i.e. IP packets with an IP Protocol field indicating the next protocol as TCP) based on TCP port numbers. TCP port numbers, in general, identify the type of application being carried by a TCP connection. Currently assigned TCP port numbers are tracked at:

http://www.isi.edu/in-notes/iana/assignments/port-numbers.

Port number rules can apply to both the TCP destination and source port numbers, i.e. a TCP port number rule applies if either the destination port number or the source port number matches. A value of 0 can be used as the "don's care" value for the TCP port number fields, i.e., a port number value of 0 in a rule matches all TCP port numbers;

A sixth exemplary criteria is UDP port number A path can be selected (for IP packets containing UDP packets, i.e. IP packets with an IP Protocol field indicating the next protocol as UDP) based on UDP port numbers. UDP port numbers, in general, identify the type of application message being carried by a UDP packet. Currently assigned UDP port numbers are tracked at:

http://www.isi.edu/in-notes/iana/assignments/port-numbers.

Port number rules can apply to both the UDP destination and source port numbers, i.e. a UDP port number rule applies if either the destination port number or the source port number matches. A value of 0 can be used as the "don't care" value for the UDP port number fields, i.e., a port number value of 0 in a rule matches all TCP port numbers.

A seventh exemplary criteria is IP DS field. A path can be selected based on the Differentiated Services (DS) field in the IP header. A bit mask is used in conjunction with a configured DS field value in order to specify meaningful bits. A mask of 0 may represent a "don't care" value for the DS field, i.e., a mask of 0 matches all DS field values. The use of the IP header DS field is described in RFCs 2474 and 2475, the entire contents of which are hereby incorporated by reference.

It is noted that the above seven criteria are exemplary, and the path selection concept described above can be extended to include any field in a packet, including fields simply referenced by offset from the front of the packet.

It is further noted that the criteria may be used in combination, in order to obtain a finer granularity decision.

In one example, a course granularity decision is that all SNMP traffic is given a priority N. A finer granularity decision is SNMP traffic from host X is transmitted via path A, while SNMP traffic from host Y, is sent via path B. In this manner, the criteria may be used in a hierarchical fashion, in order to obtain a finer granularity decision. In addition to supporting path selection rules for each of these criteria, AND and OR combination operators can also be supported to link the criteria together. For example, using the AND combination operator, a rule can be defined to select a path for FTP data (for example, TCP port number 20) received from a specific host. Also, the order in which rules are specified may be significant. It is possible for a connection to match the criteria of multiple rules. Therefore, the PSK 286 can apply rules in the order specified by the operator, taking the action of the first rule which matches.

A path selection rule may select the following path information:

The primary path for any IP packets which match the rule. A primary path should always be specified in any path selection rule (including the default rule);

The secondary path for any IP packets which match the rule. The secondary path should only be used when the primary path has failed. If no secondary path is specified, any IP packets which match the rule can be discarded when the primary path fails;

The tertiary path for any IP packets which match the rule. A tertiary path can only be specified if a secondary path is specified. The tertiary path should only be used when both the primary and secondary paths have failed. If no tertiary path is specified, any IP packets which match the rule can be discarded when both the primary path and secondary path fail.

It is noted that, while the above example utilizes three paths, the general path selection concept described above can be extended to any number N (where N is an integer) paths, although the number of paths will generally be a small number in practice, for example, between 2 and 4 paths.

Paths can be specified numerically, i.e. path 1, path 2, etc., and a value of 0 can be used to indicate no path specified. The mapping of path number to physical path may be PEP End Point specific and may be determined by the PEP End Point's path activation profile. If an IP packet needs to be forwarded for which a path selection rule specifies a path number which has not been defined in the PEP End Point's path activation profile, the IP packet is discarded. Thus, creation of a rule which maps packets to an invalid path can be used as a mechanism for filtering packets.

Figure 12:
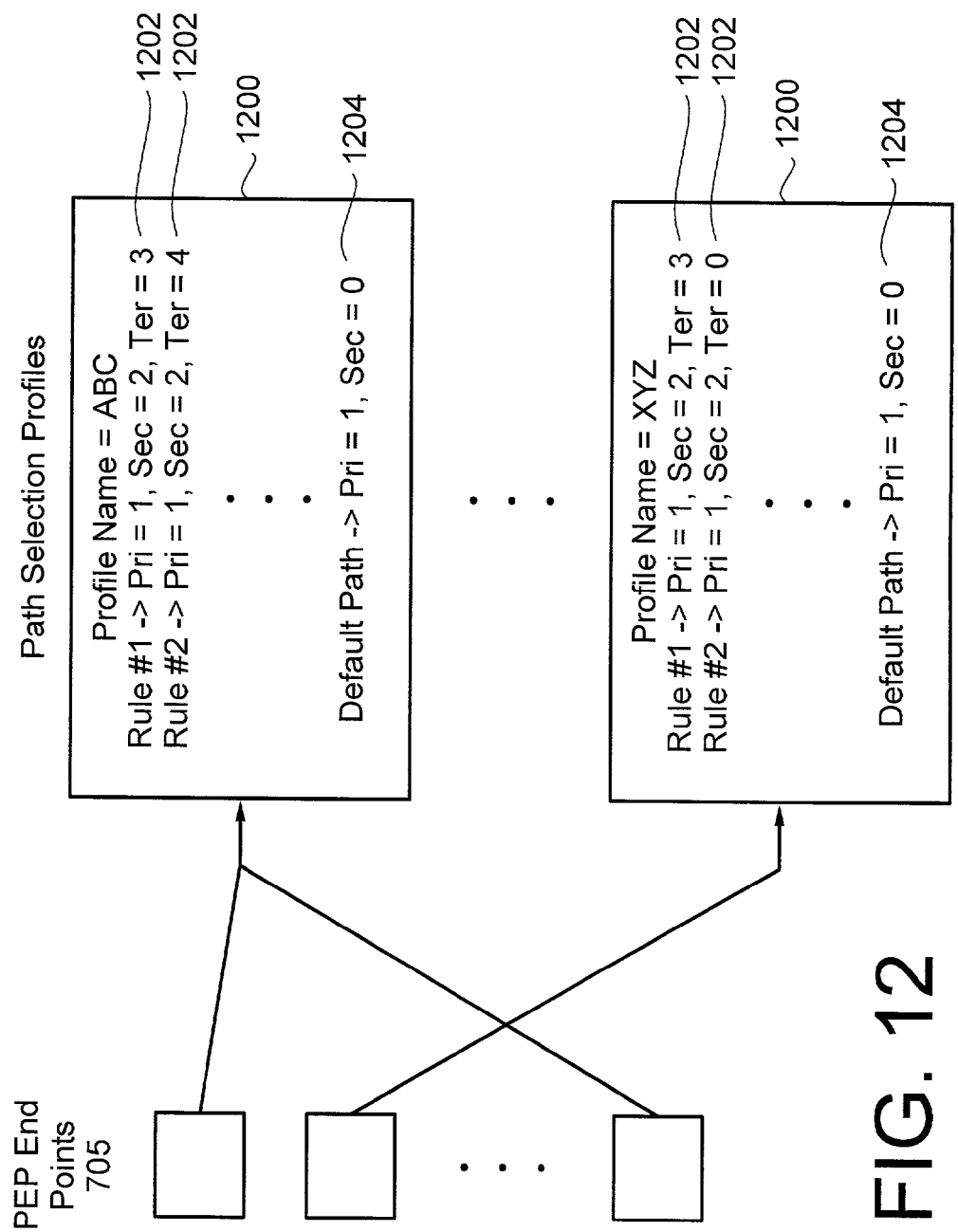
FIG. 12 is a diagram of the relationship between a path selection profile and a PEP end point, according to an embodiment of the present invention.

FIG. 12 illustrates path selection profiles 1200 in more detail. Path selection rules 1202 can be configured in the path selection profile 1200. Path selection rules 1202 can then be configured for a PEP End Point 705 by means of the path selection profile 1200 selected for the PEP End Point 705. In addition to the rules, a default rule 1204 can be defined in each path selection profile 1200. The default rule 1204 can be used to assign a primary, secondary and tertiary (etc.) path to any IP packet which does not match any of the defined rules 1202.

A path activation profile 1200 can map paths from a PEP End Point 705 to other PEP End Points to the physical ports of the PEP End Point and can assign to each mapping a path number which can be used in a path selection rule 1202. Because different PEP End Point platforms may have different potential interfaces, path activation mapping should be platform specific. Therefore, different path activation profile subtypes can be used for each PEP End Point platform, tailored for use with that platform 210. Managing path activation profiles should be the responsibility of the platform environment 210, and normally not the responsibilities of the PSK 286. Exemplary path activation profile subtypes are described below.

Path activation need not be related to configuring the physical ports of the PEP End Point platforms or with the use a particular port for reception of traffic from other PEP End Points. Path activation can be used in conjunction with path selection for IP packets being transmitted towards other PEP End Points.

Figure 13:
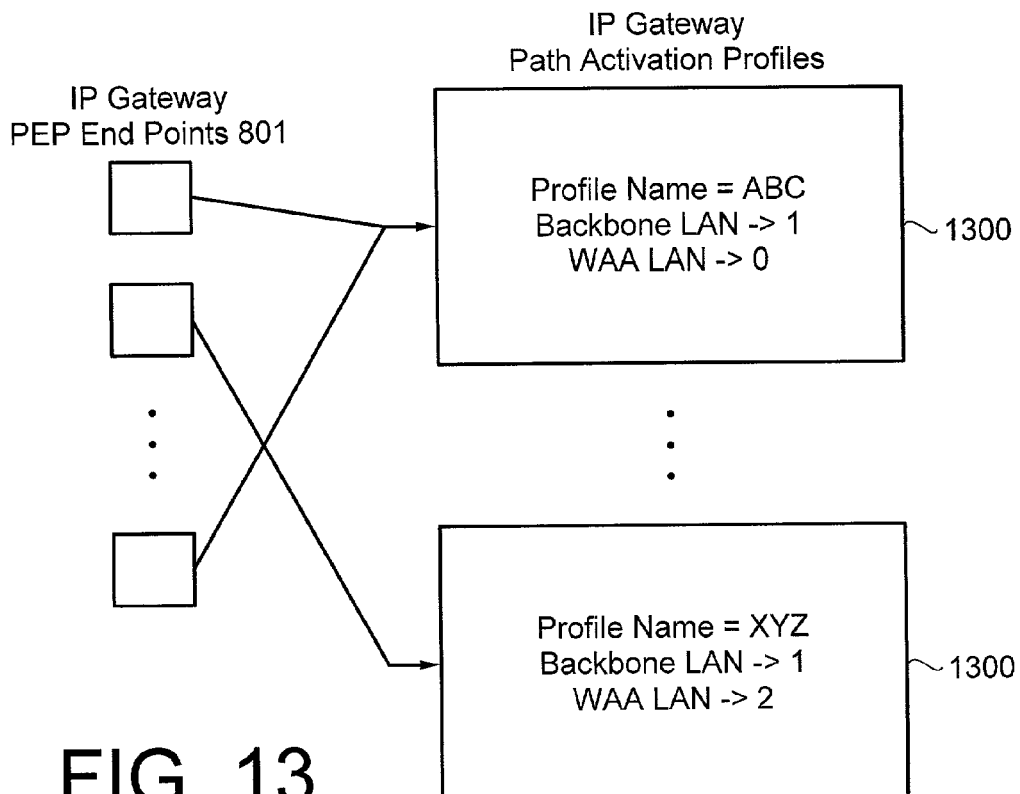
FIG. 13 is a diagram of the relationship between an IP gateway path activation profile and an IP Gateway PEP End Point, according to an embodiment of the present invention.

FIG. 13 illustrates an exemplary relationship between IP Gateway PEP End points 801 and IP Gateway path selection profiles 1300. An IP Gateway path activation profile 1300 can be used to define path number mappings for the "to WAN" interfaces 805 of IP Gateways 801. The IP Gateway path activation profile 1300 may require the operator to define the path numbers for its Backbone LAN path and Wide Area Access LAN interface path. Each interface can be designated as being active or inactive (with respect to path selection) and can be assigned a path number between 0 and 8 (exemplary). If an interface is inactive, the interface can be assigned a path number of 0. If an interface is active, the path number assigned to it should not be 0 and should be unique among the active interfaces, e.g. only one interface can be configured as path number 1. There is no requirement that lower numbers be used before higher numbers, e.g. it is acceptable for path number 3 to be configured even though no path number 1 or 2 is configured. This makes it easier to share path selection profiles among multiple PEP End Point types, such as types 801, 901, 1001, and 1101.

Figure 14:
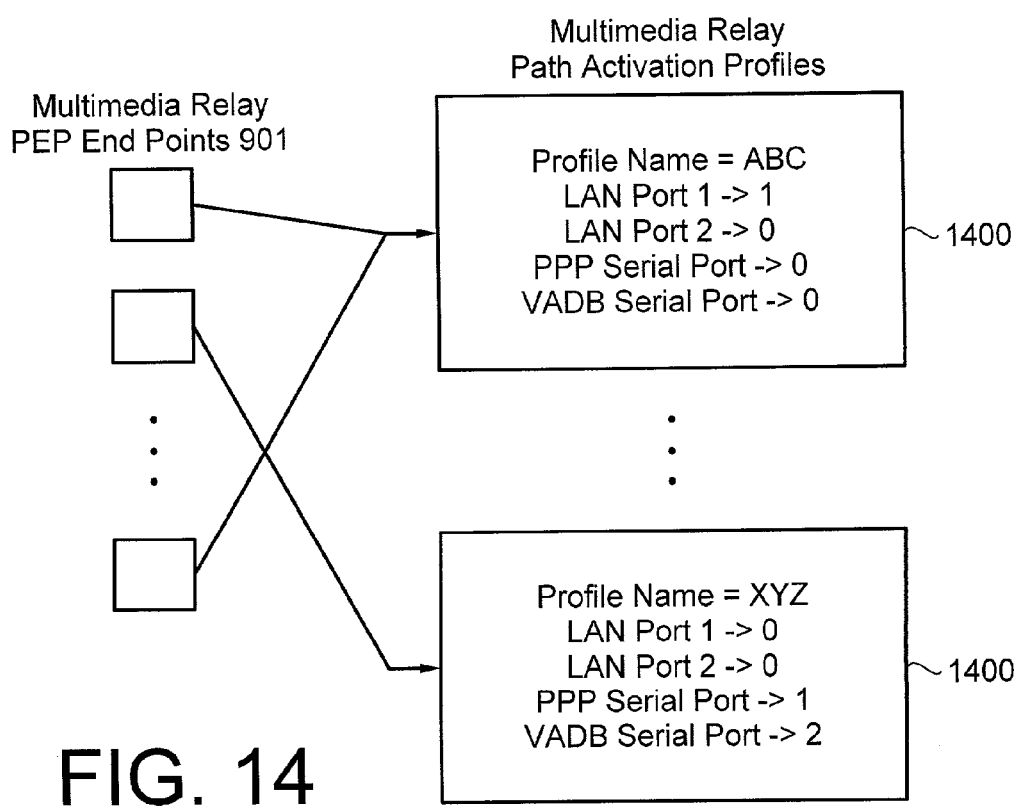
FIG. 14 is a diagram of the relationship between a Multimedia Relay path activation profile and a Multimedia Relay PEP end point.
Figure 15:
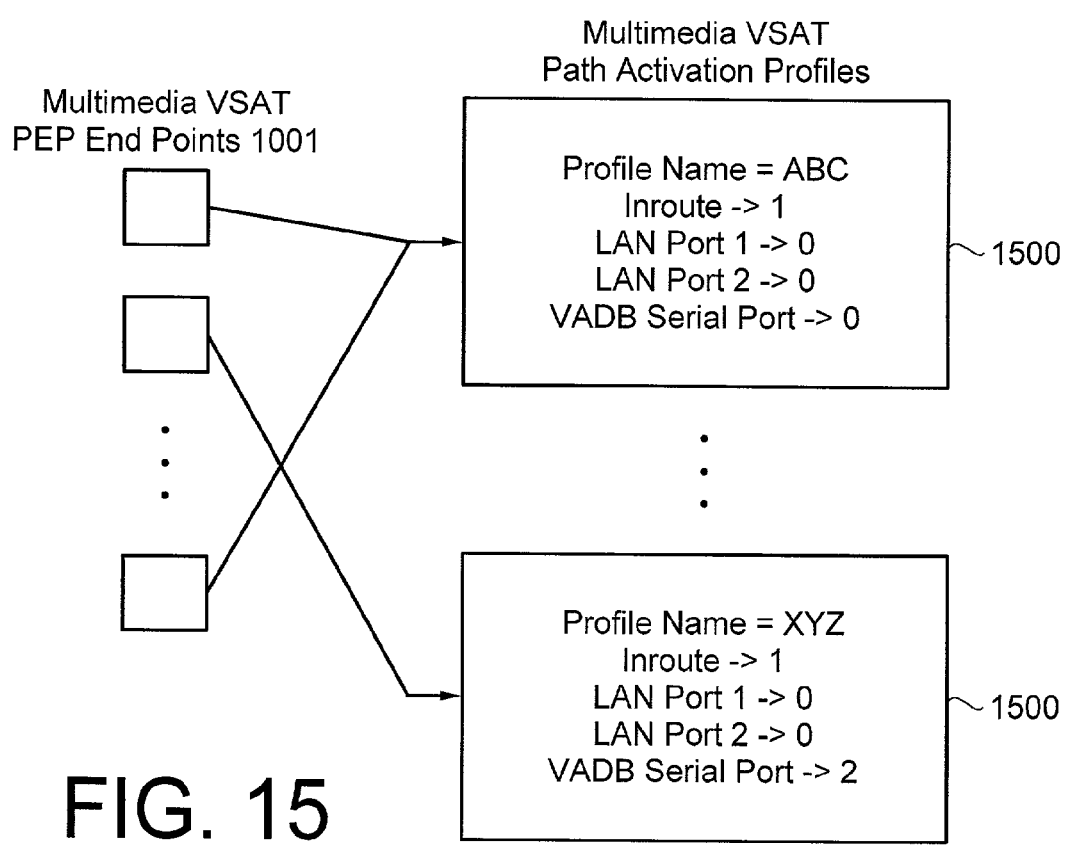
FIG. 15 is a diagram of the relationship between a Multimedia VSAT path activation and a Multimedia VSAT PEP end point, according to an embodiment of the present invention.

FIG. 14 illustrates an exemplary relationship between Multimedia Relay PEP End Points 901 and Multimedia Relay path selection profiles 1400. A Multimedia Relay path activation profile 1400 can be used to define path number mappings for the "to WAN" interfaces 905 of Multimedia Relay PEP End points 901. The Multimedia Relay path activation profile 1400 may require the operator to define the path numbers for the Multimedia Relay's LAN interfaces 903, PPP serial port interface and VADB serial port interface. Each interface can be designated as being active or inactive (with respect to path selection) and can be assigned a path number between 0 and 8 (exemplary). If an interface is inactive, the interface can be assigned a path number of 0. If an interface is active, the path number assigned to it should not be 0 and should be unique among all of the active interfaces, e.g. only one interface can be configured as path number 1. There is no requirement that lower numbers be used before higher numbers, e.g. it is acceptable for path number 3 to be configured even though no path number 1 or 2 is configured. If the operator defines a non-existent interface as active, the interface can be considered as failed by the Multimedia Relay 901 and traffic should be processed accordingly. FIG. 15 illustrates an exemplary relationship between Multimedia VSAT PEP End Points 1001 and Multimedia VSAT path selection profiles 1500. A Multimedia VSAT path activation profile 1500 can be used to define path number mappings for the "to WAN" interfaces 1005 of Multimedia VSAT PEP End points 1001. The Multimedia VSAT path activation profile 1500 may require the operator to define the path numbers for its DMN inroute interface, its LAN interfaces 1003 and its VADB serial port interface. Each interface can be designated as being active or inactive (with respect to path selection) and is assigned a path number between 0 and 8 (exemplary). If an interface is inactive, the interface can be assigned a path number of 0. If an interface is active, the path number assigned to it should not be 0 and should be unique among all of the active interfaces, e.g. only one interface can be configured as path number 1. There is no requirement that lower numbers be used before higher numbers, e.g. it is acceptable for path number 3 to be configured even though no path number 1 or 2 is configured.

Figure 16:
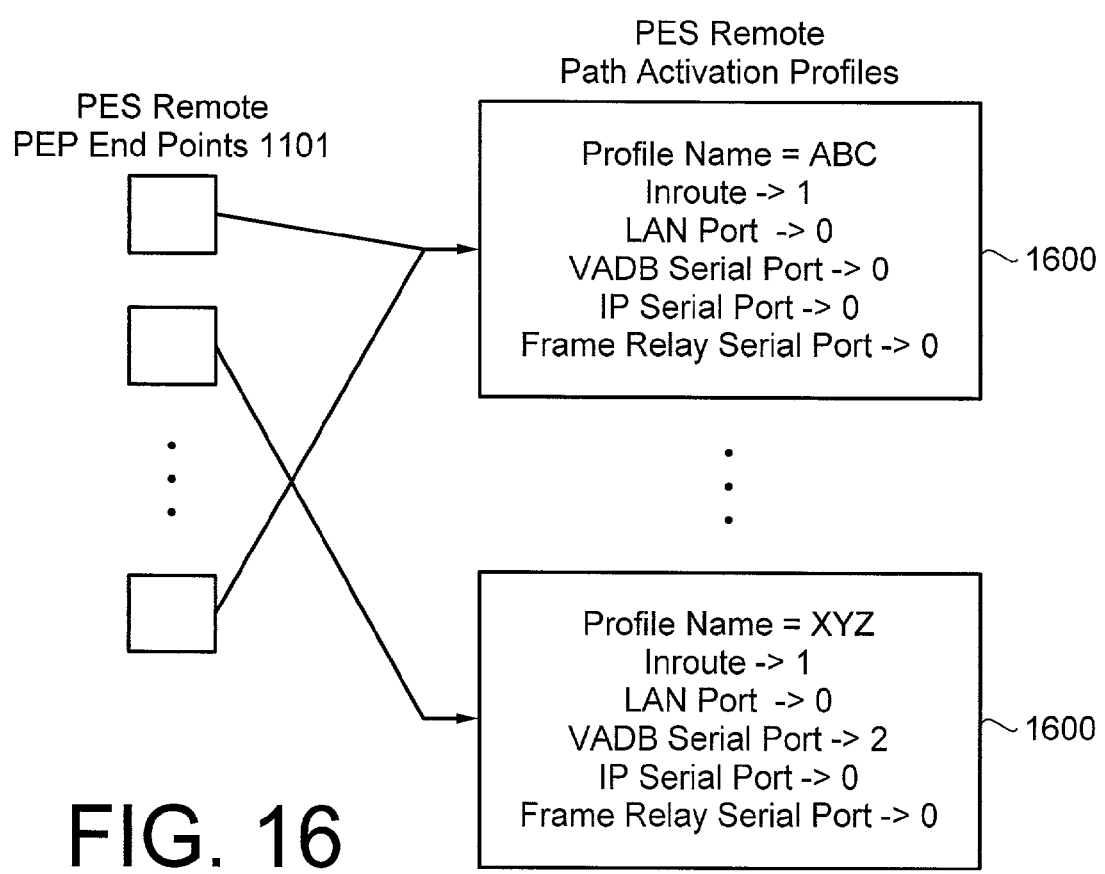
FIG. 16 is a diagram of the relationship between a PES Remote path activation profile and a PES Remote PEP end point, according to an embodiment of the present invention.

FIG. 16 illustrates an exemplary relationship between PES Remote PEP End Points 1101 and PES Remote path selection profiles 1600. A PES Remote path activation profile 1600 can be used to define path number mappings for the "to WAN" interfaces 1105 of PES Remotes 1101. The PES Remote path activation profile 1600 may require the operator to define the path numbers for its ISBN inroute interface, its LAN interface 1103, its VADB serial port interface, its Frame Relay serial port interface and its IP serial port interface. If multiple PVCs are being supported by the Frame Relay serial port interface some of which are being used for WAN connectivity and some of which are being used for local connectivity, the path activation profile may only apply to the WAN PVCs. Each interface can be designated as being active or inactive (with respect to path selection) and can be assigned a path number between 0 and 8 (exemplary). If an interface is inactive, it can be assigned a path number of 0. If an interface is active, the path number assigned to it should not be 0 and shoed be unique among all of the active interfaces, e.g. only one interface can be configured as path number 1. There is no requirement that lower numbers be used before higher numbers, e.g. it is acceptable for path number 3 to be configured even though no path number 1 or 2 is configured.

Figure 17:
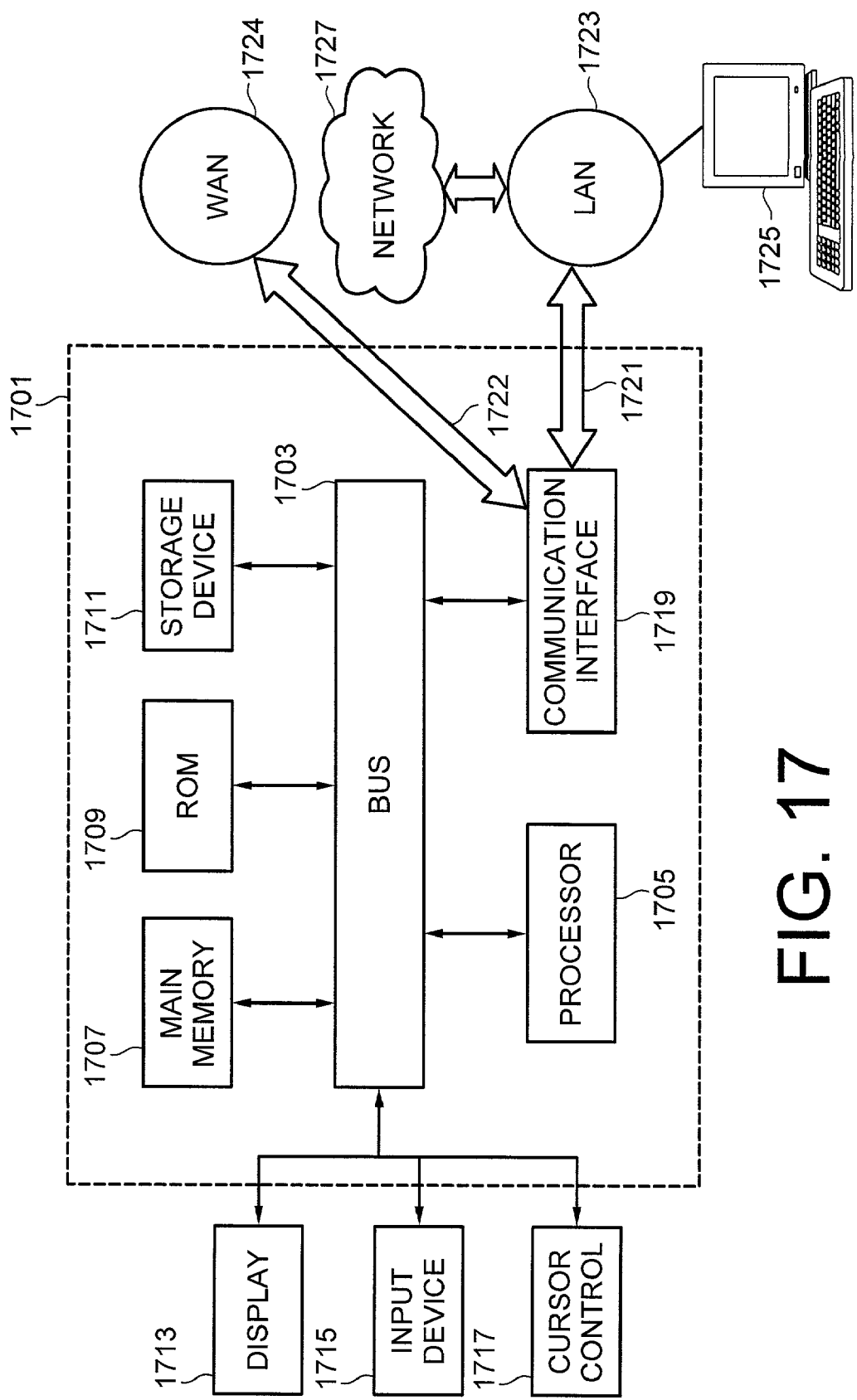
FIG. 17 is a diagram of a computer system that can perform PEP functions, in accordance with an embodiment of the present invention.
Figure 18:
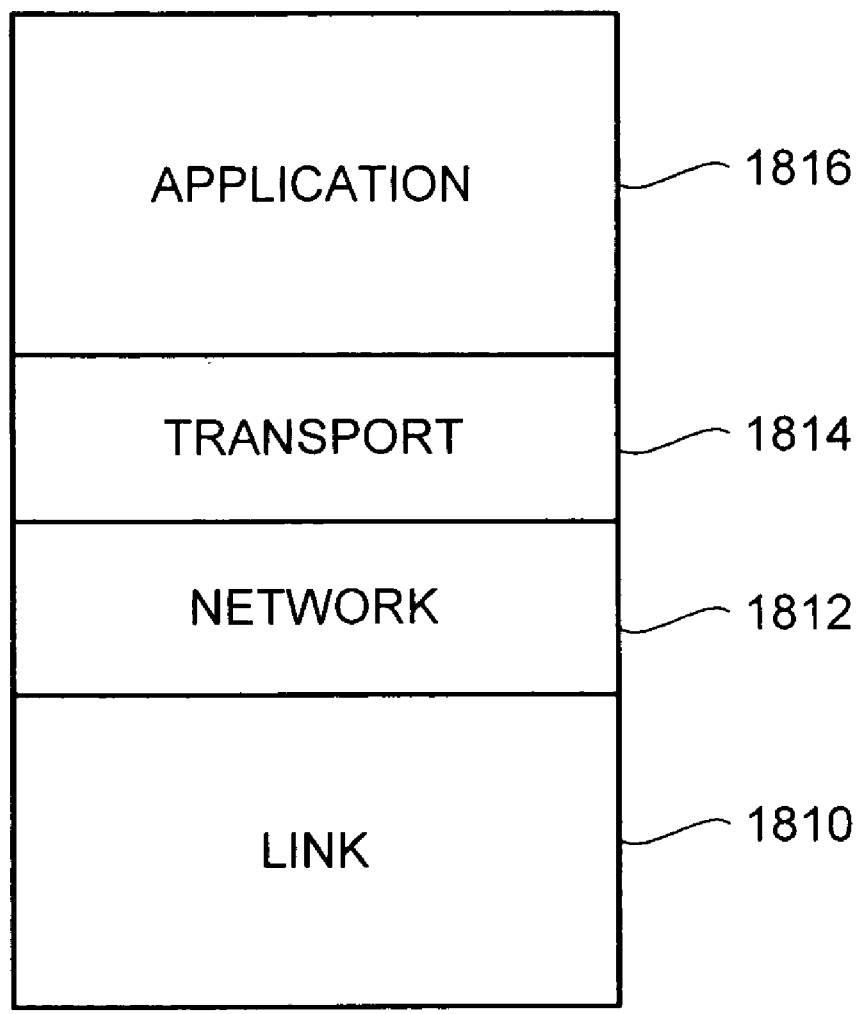
FIG. 18 is a diagram of the protocol layers of the TCP/IP protocol suite.
Figure 19:
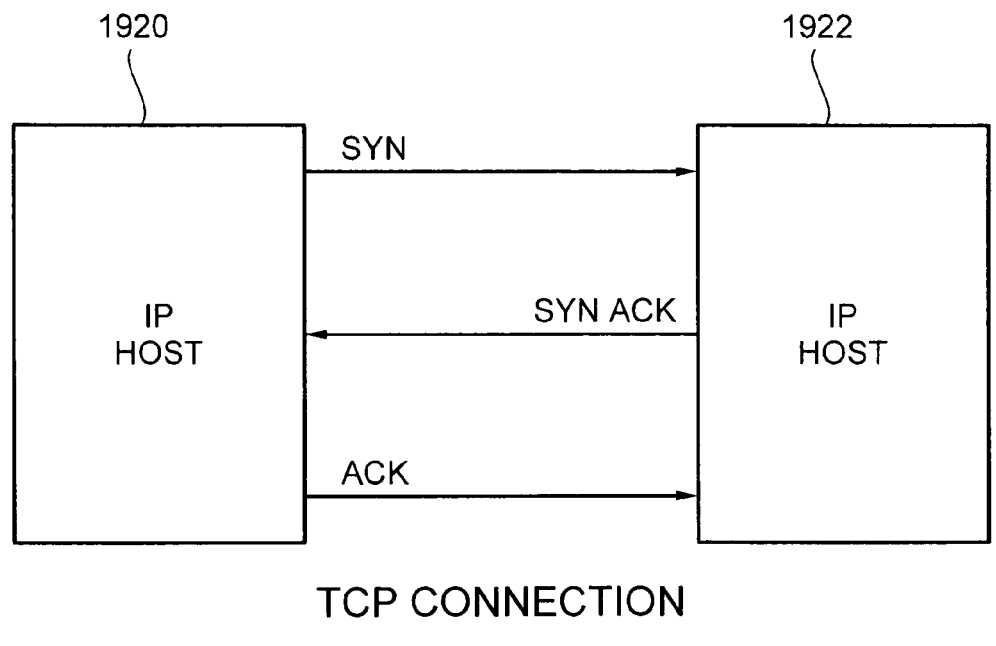
FIG. 19 is a diagram of a conventional TCP three-way handshake between IP hosts.

FIG. 17 illustrates a computer system 1701 upon which an embodiment according to the present invention may be implemented. Such a computer system 1701 may be configured as a server to execute code that performs the PEP functions of the PEP end point 210 as earlier discussed. Computer system 1701 includes a bus 1703 or other communication mechanism for communicating information, and a processor 1705 coupled with bus 1703 for processing the information. Computer system 1701 also includes a main memory 1707, such as a random access memory (RAM) or other dynamic storage device, coupled to bus 1703 for storing information and instructions to be executed by processor 1705. In addition, main memory 1707 may be used for storing temporary variables or other intermediate information during execution of instructions to be executed by processor 1705. . Main memory 1707 may also be used to store PEP control blocks, in particular, with respect to the present invention, a path selection and/or a path activation profile and buffers used to store packets. Computer system 1701 further includes a read only memory (ROM) 1709 or other static storage device coupled to bus 1703 for storing static information and instructions for processor 1705. A storage device 1711, such as a magnetic disk or optical disk, is provided and coupled to bus 1703 for storing information and instructions.

Computer system 1301 may be coupled via bus 1303 to a display 1313, such as a cathode ray tube (CRT), for displaying information to a computer user. An input device 1715, including alphanumeric and other keys, is coupled to bus 1703 for communicating information and command selections to processor 1705. Another type of user input device is cursor control 1717, such as a mouse, a trackball, or cursor direction keys for communicating direction information and command selections to processor 1705 and for controlling cursor movement on display 1713.

Embodiments are related to the use of computer system 1701 to perform the PEP functions of the PEP end point 210. According to one embodiment, this automatic update approach is provided by computer system 1701 in response to processor 1705 executing one or more sequences of one or more instructions contained in main memory 1707. Such instructions may be read into main memory 1707 from another computer-readable medium, such as storage device 1711. Execution of the sequences of instructions contained in main memory 1707 causes processor 1705 to perform the process steps described herein. One or more processors in a multi-processing arrangement may also be employed to execute the sequences of instructions contained in main memory 1707. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 1705 for execution the PEP functions of the PEP end point 210. Such a medium may take many forms, including but not limited to, non-volatile media, volatile media, and transmission media. Non-volatile media includes, for example, optical or magnetic disks, such as storage device 1711. Volatile media includes dynamic memory, such as main memory 1707. Transmission media includes coaxial cables, copper wire and fiber optics, including the wires that comprise bus 1703. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1705 for execution. For example, the instructions may initially be carried on a magnetic disk of a remote computer. The remote computer can load the instructions relating to execution of the PEP functions of the PEP end point 210 into its dynamic memory and send the instructions over a telephone line using a modem. A modem local to computer system 1701 can receive the data on the telephone line and use an infrared transmitter to convert the data to an infrared signal. An infrared detector coupled to bus 1703 can receive the data carried in the infrared signal and place the data on bus 1703. Bus 1703 carries the data to main memory 1707, from which processor 1705 retrieves and executes the instructions. The instructions received by main memory 1707 may optionally be stored on storage device 1711 either before or after execution by processor 1705.

Computer system 1701 also includes one or more communication interfaces 1719 coupled to bus 1703. Communication interfaces 1719 provide a two-way data communication coupling to network links 1721 and 1722, which are connected to a local area network (LAN) 1723 and a wide area network (WAN) 1724, respectively. The WAN 1724, according to one embodiment of the present invention, may be a satellite network. For example, communication interface 1719 may be a network interface card to attach to any packet switched LAN. As another example, communication interface 1719 may be an asymmetrical digital subscriber line (ADSL) card, an integrated services digital network (ISDN) card, a cable modem, or a modem to provide a data communication connection to a corresponding type of telephone line. Wireless links may also be implemented. In any such implementation, communication interface 1719 sends and receives electrical, electromagnetic or optical signals that carry digital data streams representing various types of information.

Network link 1721 typically provides data communication through one or more networks to other data devices. For example, network link 1721 may provide a connection through local area network 1723 to a host computer 1725 or to data equipment operated by an Internet Service Provider (ISP) 1727. ISP 1727 in turn provides data communication services through the Internet 505. In addition, LAN 1723 is linked to an intranet 1729. The intranet 1729, LAN 1723 and Internet 505 all use electrical, electromagnetic or optical signals that carry digital data streams. The signals through the various networks and the signals on network link 1721 and through communication interface 1719, which carry the digital data to and from computer system 1701, are exemplary forms of carrier waves transporting the information.

Computer system 1701 can send messages and receive data, including program code, through the network(s), network link 1721 and communication interface 1719. In the Internet example, a server 1731 might transmit a requested code for an application program through Internet 505, ISP 1327, LAN 1723 and communication interface 1719. The received code may be executed by processor 1705 as it is received, and/or stored in storage device 1711, or other non-volatile storage for later execution. In this manner, computer system 1701 may obtain application code in the form of a carrier wave. Computer system 1701 can transmit notifications and receive data, including program code, through the network(s), network link 1721 and communication interface 1719.

The techniques described herein provide several advantages over prior approaches to improving network performance, particularly in a packet switched network such as the Internet. A local PEP end point and a remote PEP end point communicate to optimize the exchange of data through a TCP spoofing functionality. A path selection kernel provides ease of configuration of the end points through the use of profiles.

Obviously, numerous modifications and variations of the present invention are possible in light of the above teachings. It is therefore to be understood that within the scope of the appended claims, the invention may be practiced otherwise than as specifically described herein.

What is claimed is:

1. A method for routing information in a communication system that includes a platform and a path selection/activation apparatus configured to perform a plurality of performance enhancing functions, the method comprising:

receiving the information from the platform and receiving at least one of path selection parameters and path activation parameters, the path selection parameters including parameters for providing selective traffic splitting between a plurality of paths to a second platform that is configured to provide the performance enhancing functions including one or more of protocol spoofing, local data acknowledgement, data compression and encryption, and the path activation parameters including parameters for mapping the paths to physical ports of the platform, wherein the path selection/activation apparatus maintains a profile that contains the at least one of the path selection and path activation parameters; and routing the information in accordance with the profile.

2. The method of claim 1, further comprising:
   determining the path by applying path selection rules.

3. The method of claim 2, wherein the path selection rules permit failure to N alternate paths, where N is an integer greater than one.

4. The method of claim 1, further comprising:
   determining whether the information should be forwarded using an alternate path and
   determining which portions of the information should be dropped when one or more paths fail.

5. The method of claim 1, further comprising:
   receiving the at least one of path selection parameters and path activation parameters as a data structure from the platform.

6. The method of claim 1, further comprising:
   receiving at least one of path selection parameters and path activation parameters from the platform at start-up or when the platform receives updated path selection or path activation parameters.

7. The method of claim 1, further comprising:
   applying rules to ensure all packets of information related to the common traffic flow take a common path.

8. The method of claim 1, further comprising:
   applying rules which allow packets of information from the same traffic flow to travel via different paths.

9. The method of claim 1, further comprising:
   applying multiple path selection or path activation rules using boolean operators.

10. A communication system comprising:
    a platform configured to provide performance enhancing functions including one or more of protocol spoofing, local data acknowledgement, data compression and encryption, the platform supplying information and at least one of path selection and path activation parameters;
    a path selection/activation apparatus communicating with the platform, the path selection/activation apparatus being configured to receive the information and the at least one of path selection and path activation parameters from the platform, the path selection parameters including parameters for providing selective traffic splitting between a plurality of paths to a second platform that is configured to provide the performance enhancing functions, and the path activation parameters including parameters for mapping the paths to physical ports of the platform, wherein the path selection/activation apparatus has a profile that specifies at least one of path selection and path activation parameters, wherein the communication system is configured to rout the information in accordance with the profile.

11. The communication system of claim 10, wherein the path selection/activation apparatus determines the path by applying path selection rules.

12. The communication system of claim 11, wherein the path selection rules permit failure to N alternate paths, where N is an integer greater than one.

13. The communication system of claim 10, wherein the path selection/activation apparatus determines whether the information should be forwarded using an alternate path and which portions of the information should be dropped when one or more paths fail.

14. The communication system of claim 10, wherein the path selection/activation apparatus receives the at least one of path selection parameters and path activation parameters as a data structure from the platform.

15. The communication system of claim 10, wherein the path selection/activation apparatus receives at least one of path selection parameters and path activation parameters from the platform at start-up or when the platform receives updated path selection or path activation parameters.

16. The communication system of claim 10, wherein the path selection/activation apparatus implements rules to ensure all packets of information related to the common traffic flow take a common path.

17. The communication system of claim 10, wherein the path selection/activation apparatus applies rules which allow packets of information from the same traffic flow to travel via different paths.

18. The communication system of claim 10, wherein the path selection/activation apparatus can apply multiple path selection or path activation rules, combined using boolean operators.

19. A path selection/activation apparatus for routing information in a communication system that includes a platform configured to perform a plurality of performance enhancing functions, the apparatus comprising:
    means for receiving the information and at least one of path selection and path activation parameters, the path selection parameters including parameters for providing selective traffic splitting between a plurality of paths to a second platform that is configured to provide the performance enhancing functions including one or more of protocol spoofing. local data acknowledgement, data compression and encryption, and the path activation parameters including parameters for mapping the paths to physical ports of the platform;
    means for maintaining a profile containing the at least one of path selection and path activation parameters; and
    means for routing the information in accordance with the profile.

20. The path selection/activation apparatus of claim 19, wherein the path selection/activation apparatus determines the path by applying path selection rules.

21. The path selection/activation apparatus of claim 20, wherein the path selection rules permit failure to N alternate paths, wherein N is an integer greater than one.

22. The path selection/activation apparatus of claim 19, wherein the path selection/activation apparatus determines whether the information should be forwarded using an alternate path and which portions of the information should be dropped when one or more paths fail.

23. The path selection/activation apparatus of claim 19, wherein the path selection/activation apparatus receives the at least one of path selection parameters and path activation parameters as a data structure from the platform.

24. The path selection/activation apparatus of claim 19, wherein the path selection/activation apparatus receives at least one of path selection parameters and path activation parameters from the platform at start-up or when the platform receives updated path selection or path activation parameters.

25. The path selection/activation apparatus of claim 19, wherein the path selection/activation apparatus implements rules to ensure all packets of information related to the common traffic flow take a common path.

26. The path selection/activation apparatus of claim 19, wherein the path selection/activation apparatus applies rules which allow packets of information from the same traffic flow to travel via different paths.

27. The path selection/activation apparatus of claim 19, wherein the path selection/activation apparatus can apply multiple path selection or path activation rules, combined using boolean operators.

28. A computer-readable medium carrying one or more sequences of one or more instructions for routing information in a communication system that includes a platform and a path selection/activation apparatus configured to perform a plurality of performance enhancing functions, the one or more sequences of one or more instructions including instructions which, when executed by one or more processors, cause the one or more processors to perform the steps of:

receiving the information from the platform and receiving at least one of path selection parameters and path activation parameters, the path selection parameters including parameters for providing selective traffic splitting between a plurality of paths to a second platform that is configured to provide the performance enhancing functions including one or more of protocol spoofing, local data acknowledgement, data compression and encryption, and the path activation parameters including parameters for mapping the paths to physical ports of the platform, wherein the path selection/activation apparatus maintains a profile that contains the at least one of the path selection and path activation parameters; and routing the information in accordance with the profile.

29. The computer-readable medium of claim 28, further comprising:

determining the path by applying path selection rules.

30. The computer-readable medium of claim 29, wherein the path selection rules permit failure to N alternate paths, where N is an integer greater than one.

31. The computer-readable medium of claim 28, further comprising:

determining whether the information should be forwarded using an alternate path and determining which portions of the information should be dropped when one or more paths fail.

32. The computer-readable medium of claim 28, further comprising:

receiving the at least one of path selection parameters and path activation parameters as a data structure from the platform.

33. The computer-readable medium of claim 28, further comprising:

receiving at least one of path selection parameters and path activation parameters from the platform at start-up or when the platform receives updated path selection or path activation parameters.

34. The computer-readable medium of claim 28, further comprising:

applying rules to ensure all packets of information related to the common traffic flow take a common path.

35. The computer-readable medium of claim 28, further comprising:

applying rules which allow packets of information from the same traffic flow to travel via different paths.

36. The computer-readable medium of claim 28, further comprising: applying multiple path selection or path activation rules using boolean operators.

* * * * *